US010892889B2

(12) United States Patent
Coleridge et al.

(10) Patent No.: US 10,892,889 B2
(45) Date of Patent: Jan. 12, 2021

(54) SYSTEMS AND METHODS FOR AN ENHANCED XOR CIPHER THROUGH EXTENSIONS

(71) Applicants: Robert Coleridge, Bellingham, WA (US); Joel Zwald, Everson, WA (US)

(72) Inventors: Robert Coleridge, Bellingham, WA (US); Joel Zwald, Everson, WA (US)

(73) Assignee: COLERIDGE ENTERPRISES LLC, Bellingham, WA (US)

( * ) Notice: Subject to any disclaimer, the term of this patent is extended or adjusted under 35 U.S.C. 154(b) by 161 days.

(21) Appl. No.: 16/057,736

(22) Filed: Aug. 7, 2018

(65) Prior Publication Data
US 2019/0044704 A1   Feb. 7, 2019

Related U.S. Application Data

(63) Continuation-in-part of application No. 15/082,853, filed on Mar. 28, 2016, now abandoned.

(60) Provisional application No. 62/144,027, filed on Apr. 7, 2015.

(51) Int. Cl.
*H04L 9/06* (2006.01)
*H04L 9/08* (2006.01)

(52) U.S. Cl.
CPC .......... *H04L 9/0662* (2013.01); *H04L 9/0869* (2013.01); *H04L 2209/043* (2013.01)

(58) Field of Classification Search
CPC .............. H04L 9/0662; H04L 9/0869; H04L 2209/043
See application file for complete search history.

(56) References Cited

U.S. PATENT DOCUMENTS

| 5,297,207 A * | 3/1994 | Degele | H04L 9/0869 331/78 |
| 6,185,682 B1 * | 2/2001 | Tang | G06F 21/31 380/262 |
| 6,745,331 B1 * | 6/2004 | Silverbrook | G06F 21/31 726/36 |
| 7,093,137 B1 * | 8/2006 | Sato | G06F 21/6227 380/277 |

(Continued)

*Primary Examiner* — Aravind K Moorthy
(74) *Attorney, Agent, or Firm* — Kevin Schraven; Anooj Patel; Hankin Patent Law, APC

(57) ABSTRACT

A system and method for providing a rapid, yet highly secure cryptographic application, to provide enhanced protection for digital data. At least one random value and Deterministic Sequence Generator (DSG) seeds are mathematically processed to create an initialization value (IV). The initialization value (IV) is mathematically processed with a user key to generate a set of initial DSG vectors. The initial DSG vectors are then inputted into a DGS component, and, using the initial DSG vectors, the DSG component creates an additive table and a substitution table. An initial internal working key is generated from the user key and the initial DSG vectors. An addition, an XOR and a substitution operation is applied to each byte of plaintext data in combination with the internal working key to enable the cipher to quickly and effectively encrypt the plaintext data. Once encrypted, the encrypted data may be stored in memory for subsequent use and/or transmitted to another party. Decryption of the encrypted data may be performed by applying the inverse of the above process.

20 Claims, 6 Drawing Sheets

(56) References Cited

U.S. PATENT DOCUMENTS

| | | | |
|---|---|---|---|
| 7,143,288 B2* | 11/2006 | Pham et al. | G06F 21/6218 713/165 |
| 8,014,526 B2* | 9/2011 | Billhartz | H04L 63/0435 380/262 |
| 2001/0031050 A1* | 10/2001 | Domstedt | H04L 9/0861 380/44 |
| 2002/0023209 A1* | 2/2002 | Domstedt | H04L 9/065 713/160 |
| 2003/0053625 A1* | 3/2003 | Bially | H04L 9/0631 380/42 |
| 2003/0172268 A1* | 9/2003 | Walmsley | H04L 9/002 713/168 |
| 2003/0210787 A1* | 11/2003 | Billhartz | H04L 63/0435 380/270 |
| 2004/0203591 A1* | 10/2004 | Lee | H04W 12/0013 455/410 |
| 2005/0015589 A1* | 1/2005 | Silverman | H04L 1/1803 713/160 |
| 2006/0129545 A1* | 6/2006 | Golle | G06F 21/6245 |
| 2006/0227974 A1* | 10/2006 | Haraszti | H04L 9/0662 380/280 |
| 2007/0180272 A1* | 8/2007 | Trezise | G06F 11/1448 713/193 |
| 2009/0103722 A1* | 4/2009 | Anderson | H04L 9/0841 380/44 |
| 2010/0017615 A1* | 1/2010 | Boesgaard Sorensen | G06F 21/64 713/176 |
| 2010/0046755 A1* | 2/2010 | Fiske | H04L 9/0822 380/256 |
| 2010/0067687 A1* | 3/2010 | Chandramouli | H04L 9/0618 380/37 |
| 2010/0290623 A1* | 11/2010 | Banks | H04L 9/0894 380/277 |
| 2012/0011351 A1* | 1/2012 | Mundra | G06F 21/72 713/1 |
| 2013/0067225 A1* | 3/2013 | Shochet | G06F 21/6209 713/165 |
| 2013/0073850 A1* | 3/2013 | Zaverucha | H04L 9/0869 713/168 |
| 2013/0202111 A1* | 8/2013 | El Gamal | H04L 9/065 380/270 |
| 2013/0236112 A1* | 9/2013 | Oka | H03M 7/3062 382/232 |
| 2013/0237278 A1* | 9/2013 | Oka | H04W 48/18 455/524 |
| 2014/0237261 A1* | 8/2014 | Diep | G06F 12/1408 713/189 |
| 2014/0310779 A1* | 10/2014 | Lof | H04L 9/102 726/4 |
| 2015/0033016 A1* | 1/2015 | Thornton | H04L 9/0825 713/171 |
| 2015/0278634 A1* | 10/2015 | Kato | G06K 9/4628 382/197 |
| 2015/0304102 A1* | 10/2015 | Nakano | H04L 9/065 713/189 |
| 2016/0080143 A1* | 3/2016 | Kindarji | H04L 9/0637 380/28 |
| 2016/0119119 A1* | 4/2016 | Calapodescu | H04L 9/30 380/30 |
| 2017/0085371 A1* | 3/2017 | Coleridge | H04L 9/0662 |
| 2018/0076955 A1* | 3/2018 | Shields | H04W 4/70 |

* cited by examiner

SYSTEMS AND METHODS FOR AN ENHANCED XOR CIPHER THROUGH EXTENSIONS

CROSS-REFERENCE TO RELATED APPLICATIONS

This is a Continuation-in-Part application, which claims the benefit of and priority to, U.S. patent application Ser. No. 15/082,853, filed on Mar. 28, 2016, which claims the benefit of and priority to U.S. Provisional Application No. 62/144,027, filed Apr. 7, 2015, which are hereby incorporated by reference in its entirety.

BACKGROUND

The disclosed technology generally relates to cryptographic techniques and, more particularly, to cryptographic techniques that are both rapid and highly secure.

Today, digital data has become an ever-increasing component of everyday lives. Digital data is used to communicate, complete financial transactions and to store personal information. As such digital data becomes a more significant component in today's world, the ability to protect such digital data from improper usage by third parties becomes imperative. To provide such protection, users frequently turn to cryptography.

In one form, cryptography is the art and science of preparing, transmitting and reading messages in a form intended to prevent the message from being read by those not privy to secrets associated with the form. Cryptography is practiced in and widely appreciated for a wide array of applications, including gaming, computer security, healthcare information security, banking information security, military communications, mathematics, intellectual property protection and many others.

But frequently, there is an inequity with many cryptographic techniques. Some ciphers are very strong, but they are very slow and time consuming to implement. This makes such ciphers less desirable in today's fast paced technology world. Other ciphers are very fast, but they provide less significant protection and are more prone to hacking. Such lesser protection, leaves valuable digital data vulnerable to attack and confiscation by unauthorized users.

Accordingly, there has been a long felt need for a cryptographic cipher that can quickly provide very strong security for protecting today's digital data. The currently disclosed cryptographic technology fulfills this and other needs.

SUMMARY

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented hereinbelow. It is to be understood that both the following general description and the following detailed description are exemplary and explanatory only and are not restrictive.

In accordance with the embodiments disclosed herein, the present disclosure is directed to a cryptographic component or encryption/decryption application for quickly and effectively encrypting plaintext data, wherein the encrypted data may only be decrypted into its original form by using the same initial variables used during encryption. More particularly, the various embodiments are directed to a fast, yet highly secure cryptographic application which employs a process referred to herein as an Enhanced XOR Cipher Through Extensions (EXCITE) process.

In one embodiment, the cryptographic application of the present disclosure includes a Deterministic Sequence Generator (DSG) component for generating a repeatable sequence of random numbers given a fixed set of initial parameters. In operation, the cryptographic application receives a request from an associated user to encrypt plaintext data. In one embodiment, the request includes one or more random values, a user key, and one or more DSG seeds (also random numbers. The cryptographic application mathematically processes the supplied random value together with the one or more DSG seeds to generate an initialization value (IV). In some embodiments, while any random value may be used as the DSG seeds, it is desired that the DSG seeds are mathematically congruent to the formulas and algorithms used in the DSG component. The initialization value (IV) is mathematically processed with a user key to generate a set of initial DSG vectors. The initial DSG vectors are input into the DSG component.

The DSG component generates an additive table, a substitution table and an initial internal working key using the initial DSG vectors. Applying an addition, an XOR, and a substitution operation to each byte of plaintext data in combination with the internal working key enables the cryptographic component, using the EXCITE process, quickly and effectively encrypts the plaintext data. The internal working key will generally be at least twice the length of the user key, but any length key may be used.

During encryption, whenever a working key is exhausted, a new working key is generated using the current DSG vectors. This process of creating new working keys and applying the addition, XOR and substitution operations continues until all the plaintext data has been encrypted and all iterations of encryption have completed. The order of the addition, XOR and substitution operations may be altered during a given cycle of encryption and/or the processing operations can be altered between different encryption iterations. Generally, all the data processing is done by the processor at a byte level.

In one embodiment, the encryption of the plaintext data may require multiple passes through the process, particularly if there is noise injected into the data. Multiple passes over the data may be made, thus increasing the amount of processing power necessary to attack the encrypted data as each pass further removes the plaintext from the attack surface as each subsequent pass alters the very structure of the data.

In some circumstances, encrypting the plaintext data and then looping back to process the encrypted result may have a major impact in reducing the ability of brute force attacks to work since the results of any brute force approach will simply result in the requirement of another brute force attempt. In such a situation, there is no way of knowing which brute force attempt was successful.

Once encrypted, the encrypted data may be stored in a memory or other appropriate device or location for subsequent use and/or transmitted to another party. Upon receipt, the receiving party may decrypt the encrypted data using the cryptographic application and the inverse EXCITE process described above.

During decryption, the cryptographic application must use the same initial variables as used in the encryption process. In this regard, the cryptographic application accesses the initialization value (IV) from a memory or other appropriate device or location. Optionally, the cryptographic application uses the random value (and optionally any of the additional random values chosen by a user during encryption) and mathematically processes the random value(s) with one or more DSG seeds to create the initialization value (IV) used during encryption. Alternatively, the initialization value (IV) may be embedded into the data stream itself. The initialization value (IV) is mathematically processed with the user key to generate the set of initial DSG vectors. The initial DSG vectors are input into the DSG component.

The DSG component then generates a subtractive table, an inverse substitution table and an initial internal working key. Applying a substitution, an XOR and a subtraction operation to each byte of encrypted text in combination with the internal working key enables the cryptographic application to quickly and effectively decrypt the encrypted text. Whenever, during the decryption process, a working key is exhausted, a new working key is generated using the current DSG vectors. The decryption of the encrypted data may require multiple passes through the process. This process of creating new working keys and applying the subtraction, XOR and substitution operations continues until all the encrypted text has been decrypted and all iterations of decryption have completed. As with encryption, the order of the substitution, XOR and subtraction operations may be altered during a given cycle of decryption and/or the processing operations can be altered between different decryption iterations, but the same order as used during the encryption process must be used during the decryption process.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure As it will be realized, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE ILLUSTRATIVE EMBODIMENTS

Figure 1:
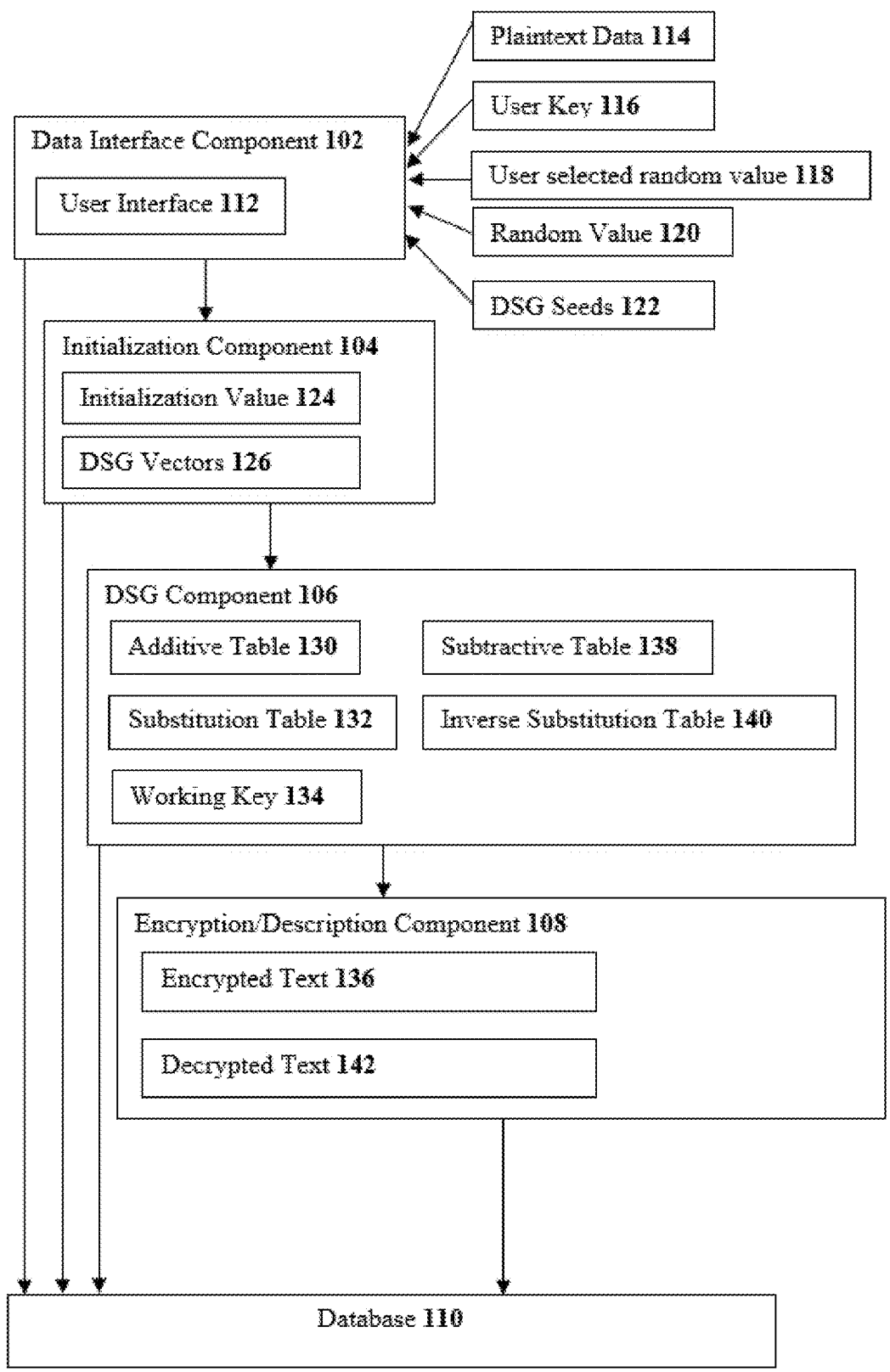
FIG. 1 is a block diagram illustrating an example embodiment of a cryptographic application configured for encrypting and decrypting plaintext data using an Enhanced XOR Cipher Through Extensions (EXCITE) process.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are signify both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware embodiments. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-10% from the indicated number or range of numbers.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

Each of the features and teachings disclosed herein may be utilized separately or in conjunction with other features and teachings to provide a cryptographic application using an Enhanced XOR Cipher Through Extensions (EXCITE). process The presently disclosed cryptographic application employing the EXCITE process, provides a fast, yet highly secure system and method for protecting digital data. The EXCITE process combines the advantages of a fast, exclusive OR (XOR) cipher with the strength and protection afforded by a one-time pad (OTP). More particularly, the EXCITE process combines the best of these two techniques, i.e. speed and strength, with a third component, namely a Deterministic Sequence Generator (DSG) component, to produce a rapid, yet highly secure cipher.

Generally, in cryptography the simple XOR operation is used to create an XOR cipher. With this operation, a string of text can be encrypted by applying XOR to every character using a given key. To decrypt the output, merely reapplying the XOR function with the key will remove the cipher.

For example, the string "Wiki" (01010111 01101001 01101011 01101001 in 8-bit ASCII) can be encrypted with the repeating key 11110011 as follows:

$$
\begin{array}{rl}
& 01010111\ 01101001\ 01101011\ 01101001 \\
XOR & 11110011\ 11110011\ 11110011\ 11110011 \\
\hline
= & 10100100\ 10011010\ 10011000\ 10011010
\end{array}
$$

And conversely, for decryption:

$$
\begin{array}{rl}
& 10100100\ 10011010\ 10011000\ 10011010 \\
XOR & 11110011\ 11110011\ 11110011\ 11110011 \\
\hline
= & 01010111\ 01101001\ 01101011\ 01101001
\end{array}
$$

The XOR operator is frequently a component in more complex ciphers. By itself, however, using a constant repeating key, a simple XOR cipher can trivially be broken by analyzing the frequency of the results, and therein lays the weakness of an XOR cipher. If the content of any message can be guessed or otherwise known, then the key can be revealed. Its primary merit is that it is simple to implement and, on modern CPUs, extremely fast and computationally inexpensive. A simple repeating XOR cipher (i.e., using the same key for XOR operation on the entire data) is, therefore, sometimes used for hiding information in cases where no particular security is required.

The key that is used in an XOR cipher generally must equal or exceed the size of the data to be encrypted and, once used that key can never be used again. Therefore, if the key is random and is at least as long as the message, the XOR cipher is much more secure than when there is key repetition within a message. However, for large data, the key size requirement of the XOR cipher requires a larger memory to execute such an encryption technique. Moreover, the requirement of non-reusability of the key further limits the XOR cipher's practicality. Accordingly, the XOR cipher generally is not practical for any large data or for repeated usage of the same key.

Similarly, a one-time pad (OTP) is a technique in which a key that is generated randomly can be used only once to encrypt a message. The message is decrypted by the receiver of the encrypted message using a matching OTP and key. Messages encrypted with such keys based on randomness have the advantage that there is theoretically no way to "break the code" by analyzing a succession of messages. Each encryption is unique and, therefore, bears no relation to the next encryption. Consequently, patterns cannot be detected or determined from the encryption process.

When using an OTP, the decrypting party must have access to the same key used to encrypt the message. Accordingly, these issues raise the problem of how to get the key to the decrypting party safely and how to keep both keys secure. Thus, secure key exchange is required to successfully use an OTP.

OTPs have sometimes been used when both parties in the cryptography process start out at the same physical location and then separate, each with knowledge of the keys in the OTP. The key used in an OTP is called a secret or private key because if it is revealed, the messages encrypted with it can easily be deciphered.

OTPs figured prominently in secret message transmission and espionage before and during World War II, and in the Cold War era. On the Internet, the difficulty of securely controlling the keys led to the invention of public key cryptography.

In use, an OTP is created by generating a string of characters or numbers that will be at least as long as the longest message that may be sent. This string of values is generated in a random fashion, for example, by someone pulling numbered balls out of a lottery machine or by using a computer program with a random number generator. The values are written down on a pad or any device that someone can read or use. The pads are given to anyone who may likely send or receive a message. Typically, a pad may be issued as a collection of keys, one for each day in a month. For example, one key expiring at the end of each day or as soon as it has been used.

When a message is to be sent, the sender uses the secret key to encrypt each character, one at a time. If a computer is used, each bit in the character (which is usually eight bits in length) is exclusively OR'd (XOR'd) with the corresponding bit in the secret key. In some embodiments, in the case of a one-time pad, the encryption algorithm is simply the XOR operation. Although, there is some concern about how truly random the key is, it is sometimes combined with another algorithm such as an MD5, i.e. a message-digest algorithm.

In one embodiment, such encryption can be described as a "100% noise source" and used to mask the message. Only the sender and receiver have the means to remove the noise. Again, once the one-time pad is used, it can't be reused. If it is reused, someone who intercepts multiple messages could begin to compare them for similar coding for words that may possibly occur in both messages.

The very nature of an OTP, if implemented correctly, guarantees mathematical un-breakability. The problem with this cipher is that it is very cumbersome to use and is very slow to process. It also requires that all recipients of encrypted data have access to the same set of 'pads' thus creating, rather than alleviating, a major security threat. This cumbersomeness and the security issues prevent an OTP from being widely used or implemented outside of strict situational instances, such as the military where the need for un-breakability outweighs the awkwardness of usage.

However, when these two ciphers (XOR and OTP) are combined with a Deterministic Sequence Generator (DSG) component, they create a very fast, yet highly secure cipher with all the advantages of speed and security, without the disadvantages associated with large data sets, repeated usage of the same key (as in an XOR cipher) or the cumbersomeness and slow speed of an OTP cipher.

More particularly, the Deterministic Sequence Generator (DSG) component uses an algorithm for generating a sequence of numbers whose properties approximate the properties of sequences of random numbers. As used herein, the term deterministic is defined as an algorithm, model, procedure, process, and the like, whose resulting behavior is entirely determined by its initial state and inputs, and which is not random or stochastic. The DSG component generated sequence is not truly random, because it is completely determined by a relatively small set of initial values, called DSG seeds (which may include truly random values). Given the same seeds, the DSG component always creates the same sequence. Although sequences that are closer to truly random may be generated using hardware based random number generators, DSGs are important in cryptography practice for their speed of number generation and their reproducibility.

During an encryption and decryption process, any deterministic number generator (DSG) component may be used, so long as both the sender and the recipient are using the same DSG. By way of example and not by way of limitation, one preferred embodiment of a DSG component is a Multiply With Carry (MWC), as shown below.

An MWC sequence is based on an arithmetic modulo a base b, usually $b=2^{32}$, because arithmetic modulo of that b is automatic in most computers. However, sometimes a base such as $b=2^{32}-1$ is used, because the arithmetic for modulus $2^{32}-1$ requires only a simple adjustment from that used for $2^{32}$, and theory for MWC sequences based on modulus $2^{32}$ has some nagging difficulties avoided by using $b=2^{32}-1$.

In its most common form, a lag-r MWC generator requires a base b, a multiplier a, and a set of r+1 random seed values, consisting of r residues of b, $x_0, x_1, x_2, \ldots, x_{r-1}$, and an initial carry $C_{r-1} < a$.

The lag-r MWC sequence is then a sequence of pairs $x_n$, $c_n$ determined by $$x_n = (ax_{n-r} + c_{n-1}) \bmod b, \quad c_n = \left\lfloor \frac{ax_{n-r} + c_{n-1}}{b} \right\rfloor, n \geq r,$$

and the MWC generator output is the sequence of x's, $x_r, rx_{r+1}, x_{r+2}, \ldots$ The period of a lag-r MWC generator is the order of b in the multiplicative group of numbers modulo $ab^r-1$. It is customary to choose a's so that $p=ab^r-1$ is a prime for which the order of b can be determined. Because 2 is a quadratic residue of numbers of the form $8k\pm1$, $b=2^{32}$ cannot be a primitive root of $p=ab^r-1$. Therefore, there are no MWC generators for base $2^{32}$ that have the maximum possible period, one of the difficulties that use of $b=2^{32}-1$ overcomes. In general, in case of a DSG, given the same set of inputs, the DSG will always output the same random number sequence.

Briefly, the cryptographic application using the EXCITE process performs the following steps to encrypt plaintext data rapidly and with high security.

In one embodiment, the cryptographic application of the present disclosure includes a Deterministic Sequence Generator (DSG) component for generating a repeatable sequence of random numbers given a fixed set of initial parameters. In operation, the cryptographic application receives a request from an associated user to encrypt plaintext data. In one embodiment, the request includes one or more random values, a user key, and one or more DSG seeds (also random numbers. The cryptographic application mathematically processes the supplied random value together with the one or more DSG seeds to generate an initialization value (IV). Note that once chosen, the DSG seeds never change throughout the given encryption/decryption process. The initialization value (IV) is mathematically processed with a user key to generate a set of initial DSG vectors. As used herein, mathematically processed can mean applying any mathematical operation to the numbers to essentially merge or combine the numbers.

The initial DSG vectors are input into the DSG component. The DSG component generates an additive table, a substitution table and an initial internal working key (the working key being generated from the user key). Applying an addition, an XOR and a substitution operation to each byte of plaintext data in combination with the internal working key enables the cryptographic application to quickly and effectively encrypt the plaintext data. Each time any values are generated, e.g., for each of the tables and/or the internal working key, the DSG vectors will change and the DSG component will provide the next random number from a sequence of random numbers generated based upon such DSG vectors.

The order of the addition, XOR and substitution operations may be altered during a given cycle of encryption (e.g., by sensing a trigger event, e.g. exceeding twice a determined noise threshold) and/or the processing operations can be altered between different encryption iterations. Of course, the same processing order may be used throughout a single encryption iteration or among the plurality of iterations. However, the same order of operations must be used during decryption as well.

The internal working key will generally be at least twice the length of the user key, but any length key may be used. Each working key is used to process n bytes of plaintext data, corresponding to a working key length of n bytes. Once a working key is exhausted, i.e., it has run its length, a new working key of n bytes is generated using the current DSG vectors.

This process of creating new working keys and applying the addition, XOR and substitution operations continues until all the plaintext has been encrypted and all iterations of encryption have completed.

Optionally, noise may be applied during the encryption process to enhance the strength of the encrypted data. In this event, a noise threshold is determined. If a byte of data exceeds the threshold, then noise is inserted into the data. For example, if a byte exceeds a value of 128 (out of 256), then the process will insert a random byte of data, and then continue with the encryption process described above.

Optionally, a second noise threshold, another trigger or an initial setting can be used to control the number of random bytes inserted into the data. That is, when a byte exceeds the noise threshold, any number of bytes of noise can be inserted into the data stream. Using noise helps to further blind the encrypted data.

Once encrypted, the encrypted data may be stored in a memory or other appropriate device or location for subsequent use and/or transmitted to another party. Upon receipt, the receiving party may decrypt the encrypted data using the cryptographic application and the inverse EXCITE process described above.

FIG. 1 illustrates an example of a cryptographic application for encrypting and decrypting data according to the present disclosure. The cryptographic application 100 includes a data interface component 102, an initialization component 104, a Deterministic Sequence Generator (DSG) component 106, an encryption/decryption component 108, and a database 110. Alternative embodiments may include different or additional components or omit one or more of the illustrated components. It is understood that the cryptographic application 100 may reside on or more physical computing devices, on one or more virtual devices, and the like, as is known in the art.

The data interface component 102 obtains or receives selected data to be used by the cryptographic application 100 to encrypt plaintext data and/or to decrypt encrypted data. More particularly, the data interface component 102 receives data to be encrypted or decrypted as well as one or more random values and/or one or more user keys to be used in the encryption or decryption of the data. In one embodiment, an associated user initiates the cryptographic application 100 by submitting a request to encrypt plaintext data via the data interface component 102. In a preferred embodiment, the request includes user supplied plaintext data 114, a user key 116, and at least one user selected random value 118. The data interface component 102 may comprise a user interface 112 to enable the user to supply a desired form of data. By way of example only, the user interface 112 may be a display used in association with a touch screen device, mouse, keyboard or any other suitable input device for enabling the user to supply the plaintext data 114, a user key 116, and at least one user selected random value 118.

The data interface component 102 also obtains a random value 120 and one or more DSG seeds 122. These values (120, 122) are delivered from any random sources (e.g., noise detected by Search for Extra Terrestrial Intelligence (SETI), or the like). In one embodiment, the data interface component 102 receives the DSG seeds 122 via the user interface 112.

By way of example only, and not by way of limitation, the DSG seeds 122 may be of any length and of any quantity. For clarity, the DSG seeds 122 are additional random values. In some embodiments, while any random value may be used as the DSG seeds 122, it is desired that the DSG seeds 122 are mathematically congruent to the formulas and algorithms used in the DSG 106. For example, a value of 0 to −1, or all seeds being the same, may not be used as DSG seeds 122 as those values would reduce the randomness of the initialization value (IV). The greater the mathematical dissimilarity of the DSG seeds 122 the better.

The data interface component 102 transmits the random value 120 and the DSG seeds 122 to the initialization component 104. The initialization component 104 is operable to mathematically process the random value 120 and the DSG seeds 122 to generate an initialization value (IV) 124. In one embodiment, the initialization component 104 may merge the random value 120 with a user selected random value 118, wherein the resultant random value is mathematically processed with the DSG seeds 122 to generate the initialization value (IV) 124. Of course, in one or more embodiments, a plurality of initialization values (IV) 124 may be used.

After generation of the initialization value (IV) 124, the initialization component 104 mathematically processes the initialization value (IV) 124 along with the user key 116 to generate initial DSG vectors 126. The initial DSG vectors 126 are transmitted to the DSG component 106 for processing thereby. The initial DSG vectors 126 may also be stored in the database 110 for subsequent access.

The DSG component 106, using the initial DSG vectors 126, generates an additive table 130, a substitution table 132, and an initial internal working key 134. In one embodiment, the initial internal working key 134 is generated using the initial DSG vectors 126 and the user key 116. The additive table 130, the substitution table 132, and the internal working key 134 may be stored in the database 110 for subsequent access.

In some embodiments, the substitution table 132 is 256 bytes with values of 0-255 randomly spread throughout the table, but without any repetition of values. Similarly, the additive table 130 is 256 bytes containing random values of 0-255. However, unlike the substitution table 132, the additive table 130 may include repeated values.

Generally, and in some embodiments, the initial internal working key 134 is twice the length of the user key 116. However, an initial internal working key 134 of any length may be used. During encryption, an n byte long initial internal working key 134 can be used to process n bytes of plaintext data 114. If the initial internal working key 134 is exhausted during the encryption of the plaintext data 114, the DSG component 106 generates a new n byte long internal working key using the DSG vectors 126 to process the next n bytes of plaintext data 114 into encrypted data. The process of generating new internal working keys 134 continues until all the plaintext data 114 has been encrypted.

In some embodiments, when creating each of the additive table 130 and the substitution table 132 the DSG component 106 shuffles the data 256 times, i.e., the DSG component 106 will place 256 random characters in each of the additive table 130 and the substitution table 132. As each random value is placed into the additive table 130 and the substitution table 132, the DSG vectors 126 are mathematically changed and then used by the DSG component 106 to create the next random value. This process continues during the creation of the internal working key 134, as well.

After the additive table 130, and the substitution table 132, and the internal working key 134 are created by the DSG component 106, the encryption/decryption component 108 starts encrypting the plaintext data 114. Once the additive table 130 and the substitution table 132 are created, they remain static during the entire encryption process. The encryption/decryption component 108 operates on the plaintext data 114 using the EXCITE algorithm, the working key 134, the additive table 130, and the substitution table 132 to encrypt the plaintext data 114 (i.e., performing multiple addition, XOR and substitution operations on the plaintext data 114).

Once the plaintext data 114 is encrypted by the encryption/decryption component 108, the encrypted text 136 may suitably be stored in the database 110 for subsequent access. The EXCITE algorithm may also be stored in the database 110.

During decryption of the encrypted text, the DSG component 108 generates a subtractive table 138 and an inverted substitution table 140, using the DSG vectors 126. The order of the creation of the subtractive table 138 and the inverted substitution table 140 must be consistent with the order used during encryption. The DSG component 108 also creates the same initial internal working key 134 that was created during the encryption process, using the DSG vectors 126 in combination with the user key 116. The cryptographic application 100 uses the methods described below with regard to FIGS. 3A-B and 4A-B to encrypt plaintext data and decrypted encrypted data.

Figure 2:
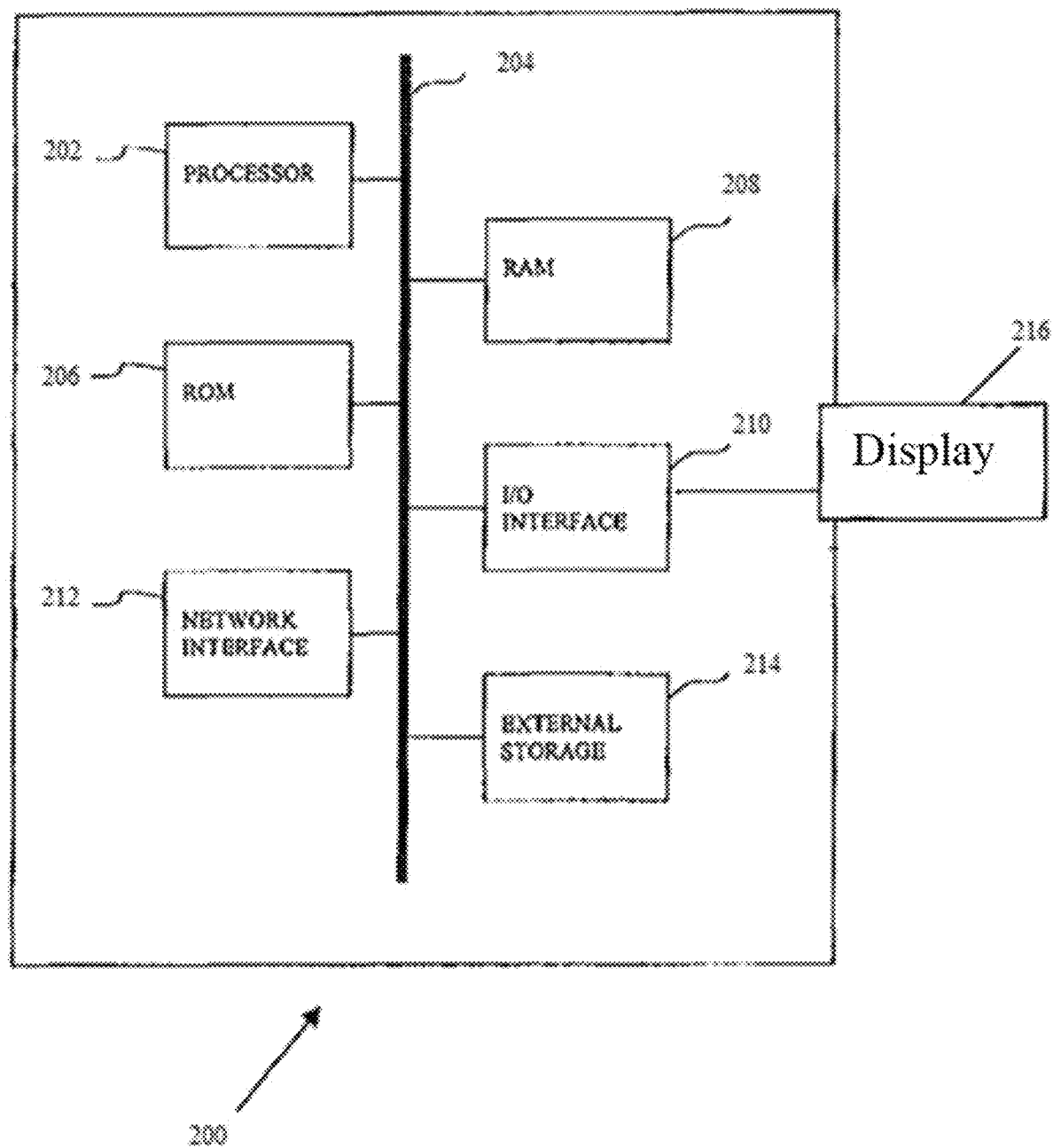
FIG. 2 is a system diagram illustrating an example embodiment of an environment in which a cryptographic application executes according to the present disclosure.

FIG. 2 is a high-level block diagram illustrating an example system environment for operation of the cryptographic application 100 according to the present disclosure. The system 200 is shown as a hardware device, but may be implemented in various forms of hardware, software, firmware, special purpose processors, or a combination thereof. Some embodiments are implemented in software as a program tangibly embodied on a program storage device. By implementing with a system or program, semi-automated or automated workflows are provided to assist in the encryption of plaintext data, decryption of encrypted data, and combinations thereof.

The system 200 is a computer, personal computer, server, PACs workstation, mobile computing device, imaging system, network processor, network, or other now know or later developed processing system. The system 200 includes at least one processor 202 operatively coupled to other components via a system bus 204. The processor 202 may be, or may comprise, any suitable microprocessor or microcontroller, for example, a low-power application-specific controller (ASIC) and/or a field programmable gate array (FPGA) designed or programmed specifically for the task of controlling a device as described herein, or a general purpose central processing unit (CPU). In one embodiment, the processor 202 may be implemented on a computer platform, wherein the computer platform includes an operating system and microinstruction code. The various processes, methods, acts, and functions described herein may be either part of the microinstruction code or part of a program (or combination thereof) which is executed via the operating system as discussed below.

The other components include memories (ROM 206 and/or RAM 208), a network access device 212, an external storage 214, an input/output device 210, and a display 216. Furthermore, the system 200 may include different or additional entities.

The input/output device 210, network access device 212, or external storage 214 may operate as the data interface component 102 operable to receive at least one of plaintext data 114, the user key 116, the user selected random value 118, the random value 120, and DSG seeds 122. Input may be received from a user or another device and/or output may be provided to a user or another device via the input/output device 210. The input/output device 210 may comprise any combinations of input and/or output devices such as buttons, knobs, keyboards, touchscreens, displays, light-emitting elements, a speaker, and/or the like. In an embodiment, the input/output device 210 may comprise an interface port (not shown) such as a wired interface, for example a serial port, a Universal Serial Bus (USB) port, an Ethernet port, or other suitable wired connection. The input/output device 210 may comprise a wireless interface (not shown), for example a transceiver using any suitable wireless protocol, for example Wi-Fi (IEEE 802.11), Bluetooth®, infrared, or other wireless standard. In an embodiment, the input/output device 210 may comprise a user interface. The user interface may comprise at least one of lighted signal lights, gauges, boxes, forms, check marks, avatars, visual images, graphic designs, lists, active calibrations or calculations, 2D interactive fractal designs, 3D fractal designs, 2D and/or 3D representations, and other interface system functions.

The network access device 212 allows the computing system 200 to be coupled to one or more remote devices (not shown) such as via an access point (not shown) of a wireless network, local area network, or other coupling to a wide area network, such as the Internet. In that regard, the processor 202 may be configured to share data with the one or remote devices via the network access device 212. The shared data may comprise, for example, encrypted data, DSG seeds, DSG vectors, user keys, working keys, and the like. In various exemplary embodiments, the network access device 212 may include any device suitable to transmit information to and from another device, such as a universal asynchronous receiver/transmitter (UART), a parallel digital interface, a software interface or any combination of known or later developed software and hardware. The network access device 212 provides a data interface operable to receive at least one of plaintext data 114, the user key 116, the user selected random value 118, the random value 120, and DSG seeds 122.

The processor 202 has any suitable architecture, such as a general processor, central processing unit, digital signal processor, application specific integrated circuit, field programmable gate array, digital circuit, analog circuit, combinations thereof, or any other now known or later developed device for processing data. The processor 202 may be a single device or include multiple devices in a distributed arrangement for parallel and/or serial processing. Likewise, processing strategies may include multiprocessing, multitasking, parallel processing, and the like. A program may be uploaded to, and executed by, the processor 202.

The processor 202 performs the workflows, data manipulation, data generation, encryption, decryption, and/or other processes described herein. The processor 202 operates pursuant to instructions. The DSG seeds, DSG vectors, user keys, additive tables, substitution tables, working keys, and the like may be stored in a computer readable memory, such as the external storage 214, ROM 206, and/or RAM 208. The instructions for implementing the processes, methods and/or techniques discussed herein are provided on computer-readable storage media or memories, such as a cache, buffer, RAM, removable media, hard drive or other suitable data storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system. Because some of the constituent system components and method acts depicted in the accompanying figures may be implemented in software, the actual connections between the system components (or the process steps) may differ depending upon the manner of programming.

The external storage 214 may be implemented using a database management system (DBMS) managed by the processor 202 and residing on a memory, such as a hard disk, RAM, or removable media. Alternatively, the storage 214 is internal to the processor 202 (e.g. cache). The external storage 214 may be implemented on one or more additional computer systems. For example, the external storage 214 may include a data warehouse system residing on a separate computer system, a PACS system, or any other now known or later developed storage system.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm as used herein is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Figure 3A:
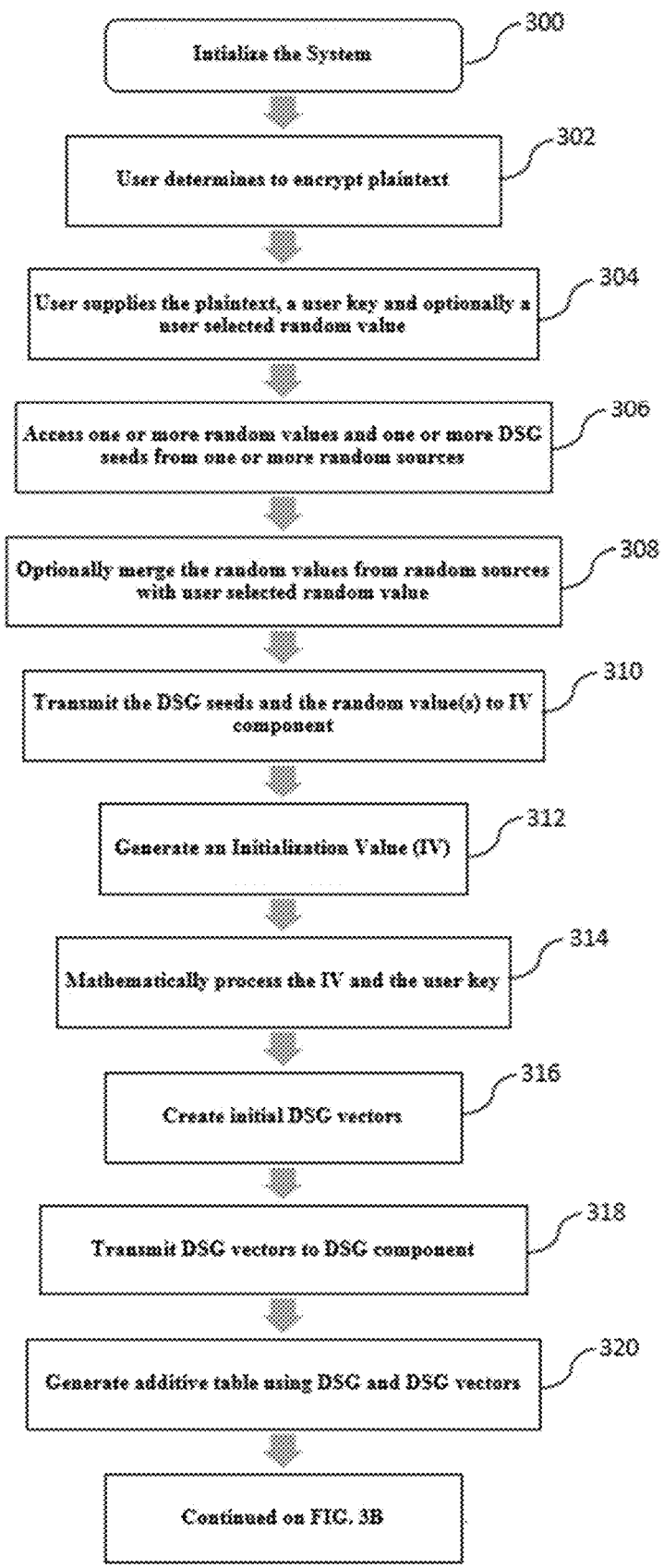
FIG. 3A-B are logic flow diagrams of an exemplary method of encrypting plaintext data using the cryptographic application according to the present disclosure.
Figure 3B:
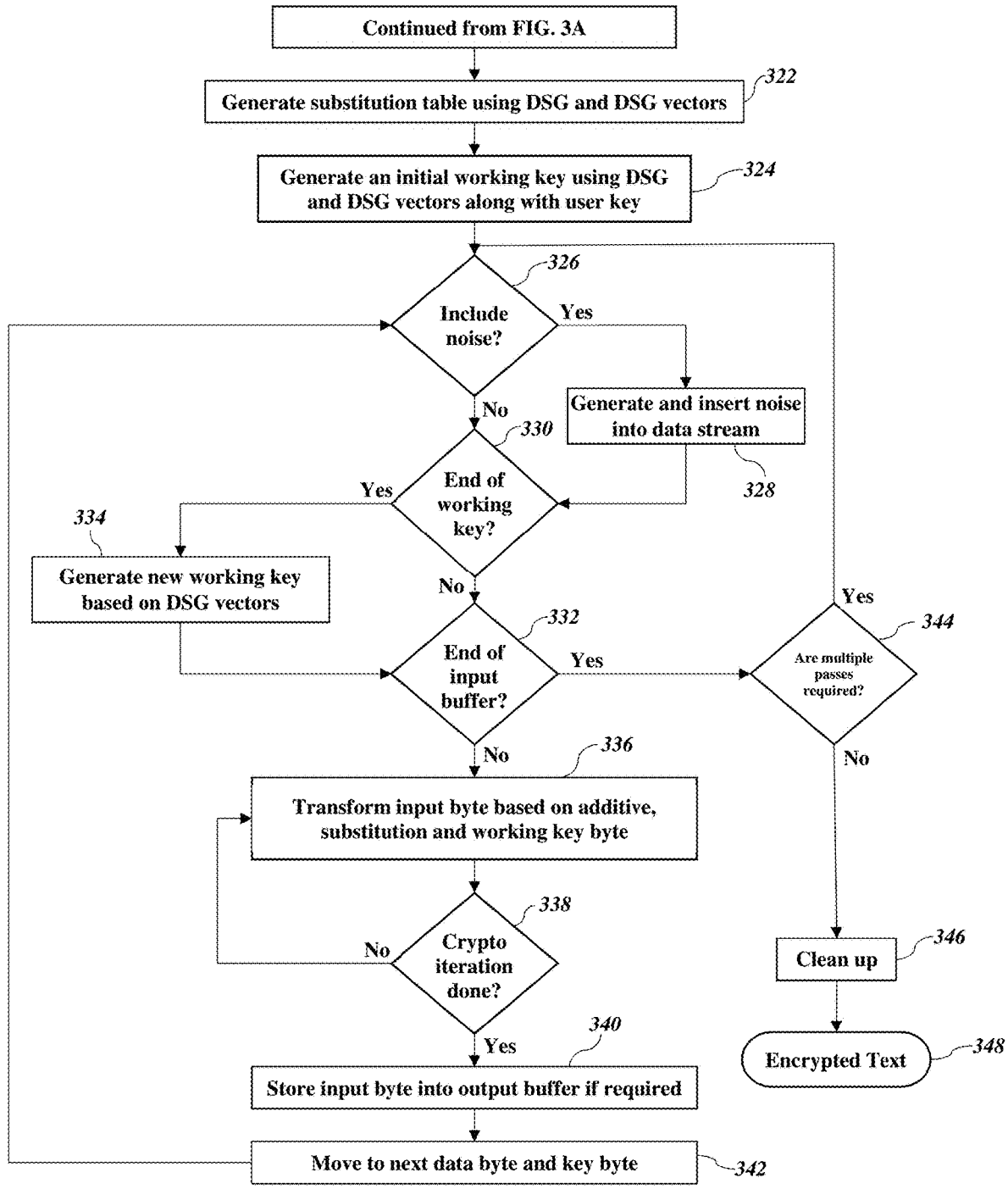

Referring again to the drawings, and more particularly to FIG. 3A-B, there is illustrated an exemplary method of encrypting plaintext data using the cryptographic application 100 according to the present disclosure.

Beginning at step 300, the cryptographic application 100 is initialized to perform the disclosed encryption process. At step 302, the user determines to encrypt plaintext data 114. Next, at step 304 the user supplies the plaintext data 114 to be encrypted, a user key 116 and, optionally, a user selected random value 118 via the data interface component 102, such as via user interface 112.

At step 306, the data interface component 102 accesses one or more random values (RV) 120 and one or more DSG seeds 122 from one or more random sources, e.g., noise detected by Search for Extra Terrestrial Intelligence (SETI) or the like. In one embodiment, the data interface component 102 may receive the DSG seeds 122 via the user interface 112. However, the DSG seeds 122 and the random values 120 may be supplied by any appropriate source or mechanism. At step 310, the data interface component 102 transmits the random value 120 and the DSG seeds 122 to the initialization component 104.

Optionally, at step 308, the initialization component 104 may merge the random values 120 with the user selected random value 118, if any. Next, at step 312, the initialization component 104 mathematically processes the DSG seeds 122 and the random values 120 (or optionally, random values 118 and 120) to generate an initialization value (IV) 124. Then, at step 314, the initialization component 104 mathematically processes the initialization value (IV) 124 and the user key 116, resulting in initial DSG vectors 126 as shown at step 316.

At step 318, the initial DSG vectors 126 are input into the DSG component 106. At steps 320 and 322, the DSG component 106 generates an additive table 130 and a substitution table 132 using the DSG vectors 126. The order of the creation of the additive table 130 and the substitution table 132 may be altered, i.e., the substitution table 132 man be created before the additive table 130 and vice-versa. However, the table creation order must remain consistent during both the encryption and decryption process. Next, at step 324, the DSG component 106 generates an initial internal working key 134 from the user key 116 using the DSG vectors 126.

Next, at step 326, the cryptographic application 100 queries whether noise should be added to the data stream. In this regard, the encryption/decryption component 108 creates a threshold for noise generation for use in the encryption process. The encryption/decryption component 108 then determines if the current byte in the plaintext data 114 exceeds the determined noise threshold. If the encryption/decryption component 108 determines that the byte of plaintext data 114 exceeds the noise threshold, the process continues to step 328. At step 328, the encryption/decryption component 108 will generate the noise and insert the generated noise (i.e., random bytes) into the data stream. Optionally, a second noise threshold, another trigger or an initial setting may be used to control the number of random bytes inserted into the data stream. That is, when a byte exceeds the noise threshold, any number of bytes of noise can be inserted into the data stream. Using noise helps to further blind the encrypted data 136.

If the encryption/decryption component 108 at step 326 determines that no noise is to be generated, the process continues at step 330. At step 330, the encryption/decryption component 108 determines if the current working key 134 has been exhausted, i.e., it has run its length of n bytes. If the working key 134 is not yet exhausted, the process continues to step 332 to determine if additional plaintext data 114 needs to be encrypted. However, if at step 330 the encryption/decryption component 108 determines that the working key 134 is exhausted, the process will continue to step 334. At step 334, the DSG component 106 will use the current DSG vectors 126 to create a new working key 134 of n bytes and then the process will continue to step 332.

At step 332, the encryption/decryption component 108 determines whether there is still plaintext data 114 remaining to be encrypted. If step 332 determines that all the plaintext data 114 has been encrypted, the process continues to 344, wherein the encryption/decryption component 108 determines whether multiple passes are required. If multiple passes are required, then the process continues to step 326, wherein the output data is the input data for the encryption.

If multiple passes are not required, then the process continues to step 346 for clean-up operations. The process then continues to step 348 where the encrypted text 136 is output for storage to the database 110 and/or subsequent transmission to another party or other use. On the other hand, if additional plaintext data 114 does remain to be encrypted, the process continues to step 336.

At step 336, the next byte of plaintext data 136 is transformed. The encryption/decryption component 108 encrypts the plaintext data 114 using the additive table 130, the substitution table 132 and the internal working key 134 to perform the appropriate addition, XOR and substitution operations on the current byte of plaintext data 114. Once step 336 is completed, the process continues to step 338 to verify that the current iteration has been completed. If not, the process returns to step 336 to complete the encryption process. However, if the iteration is complete, the process continues to step 340, wherein the input byte is stored in an output buffer as required. The process then continues to step 342, to access the next byte of plaintext data 114 and the next byte of the working key 134 used in the encryption process. Step 342 will return to step 326 in the encryption process to process the next byte of plaintext data 114.

Stated differently, and by way of example only, if an addition/XOR/substitution processing order is applied to the plaintext data 114, then the following steps summarize the encryption process:

1. A byte of plaintext data 114 is processed by adding the byte from the additive table 130 modulus the input position, thus blinding the original plaintext data 114 byte.
2. The XOR operation is then performed on this modified byte (from step 1) using the next byte of the working key 134 to blind the above modified byte.
3. Next, the correct substitution byte for this modified byte (from step 2) is determined.
4. Optionally, steps 1-3 can be repeated any number of times so that the modified byte is used as the input byte for these steps. By doing this repeatedly, the original data is blinded 'n' times.
5. Next this substitution byte is stored in the output stream to further blind the above modified byte (from step 3).
6. Optionally, the process determines if noise should be injected into the data stream.
7. The above steps are repeated until the entire length of the working key 134 has been used.

If the working key 134 is exhausted, the process generates a new working key 134 for use with encrypting the next n bytes of plaintext data 114. The above process repeats until all the plaintext data 114 has been encrypted.

By way of example only, and not by way of limitation, the following is an implementation of the cryptographic application 100 encrypting selected plaintext data using the EXCITE process.

EXAMPLE 1

In one embodiment, plaintext data 114 is encrypted with the cryptographic application 100 using the encryption method as disclosed in FIG. 3A-B. In this case, only one additive/XOR/substitution iteration pass is made per byte of plaintext data 114. The hexadecimal format is used for display purposes only. Any number format (e.g. binary and the like) can be used to implement the disclosed encryption process.

i. Plaintext data 114 is supplied by the user via the data interface component 102 or other appropriate mechanism: In this example, the plaintext data 114 is "Xotic Process".

The plaintext "Xotic Process" in shown in hexadecimal format as: 58 6f 74 69 63 20 50 72 6f 63 65 73 73.

The plaintext "Xotic Process" supplied by the user is stored in the memory 1002.

ii. User key 116 is supplied by the user via user interface 102 or by other appropriate mechanism: In this example, the user key is "xotic".

"xotic" as in hexadecimal format: 78 6f 74 69 63

The user key "xotic" is stored in the database 110.

iii. The DSG seeds 122 accessed by the data interface component 102 or supplied by the user via the user interface 112 or via other appropriate mechanism are:
DSG seed 1=1819145164
DSG seed 2=2133878803
DSG seed 3=578068005
DSG seed 4=1313382323
DSG seed 5=1542521175
DSG seed 6=1358903071
DSG seed 7=1373624615
DSG seed 8=634434395 iv. A random value 120 accessed by the data interface component 102 from any random source is 162875739.

v. An initialization value (IV) 124 is generated by the initialization component 104 by mathematically processing the DSG seeds 122 and the random value 120. There is no optional user selected random value 118 used in this example.

vi. The initial DSG vectors 126 are then generated from mathematically processing the initialization value (IV) 124 and the user key 116. The initial DSG vectors 126 are, therefore:
DSG vector 1=2113407355
DSG vector 2=1737839646
DSG vector 3=1018411089
DSG vector 4=1447247159
DSG vector 5=1867667233
DSG vector 6=1973043051
DSG vector 7=1913358075
DSG vector 8=1149134690 vii. Additive table 130 is generated by the DSG component 106 using the DSG vectors 126:
00 01 02 03 04 05 06 07 08 09 0a 0b 0c 0d 0e 0f
00 e0 74 6f 9a 0e 47 c9 bd 11 d5 ca 11 f3 d1 07 6f
10 40 3c 04 88 3b 4c 97 03 1a 12 0 f dd 8c c7 a6 2e
20 a8 67 55 e6 14 5d a0 18 43 cc 5f 13 dc 61 fa 05
30 61 94 be 7f 91 1e b1 93 db 6c 80 fa 37 eb 31 49
40 2f 9c 68 8c 7c 20 5b e1 9b eb 45 6e ec 84 26 b8
50 17 09 7b f6 08 27 9b 89 b4 c0 0a a7 db a5 df 57
60 9b 15 e3 3f f8 6e 88 41 39 db e3 a5 d7 43 a6 57
70 46 c6 e3 2e 6f 39 41 08 01 dd d7 ba 15 b2 06 f5
80 0b ed d2 d7 9f e5 bf a7 80 3a bc 2b 42 f4 b0 70
90 19 b2 61 15 c0 b0 e6 61 d2 db 3d 1a 96 cc 2b 86
a0 d5 ed 99 e9 70 ce b6 5f 06 3b ad 34 7c 16 c4 0b
b0 2c 66 a0 62 50 ef 34 5a 06 70 04 c2 a8 a4 10 b2
c0 0f 36 54 53 5a c6 00 4a fb 02 0e 85 03 b2 e3 bc
d0 16 31 ed 30 2b c8 35 e5 b9 3f e3 fe ca f2 b5 60
e0 2a fa 25 46 c0 71 b0 64 65 56 65 4e e1 ad 56 52
f0 8b 46 ac 76 b5 df 86 45 00 6e 99 1b e1 00 7e 08 viii. Substitution table 132 is generated by the DSG component 106 using the DSG vectors 126:
00 01 02 03 04 05 06 07 08 09 0a 0b 0c 0d 0e 0f
00 f6 f2 2a fc d7 9f e8 31 64 eb 1a 44 a9 1d of 1e
10 06 2b 7b 91 ac ab e7 dc c3 c2 82 29 f1 90 a0 56
20 16 80 af 97 ad ee 23 a6 6b 9c 01 b8 89 bb a2 5d
30 dd 87 46 4d 08 95 b3 22 85 4c 39 6f 8f 60 32 5f
40 54 48 0e e1 61 f8 6e 28 e9 b4 2f c8 ba a4 2c 75
50 04 6c 2e 7f 86 14 fd 4e f5 fe 3a 74 a7 3f bc 98
60 c1 be 6a e3 b6 d9 da 5a c0 df 96 cd 9e 93 49 27
70 cf fb c5 77 7e 3c 59 a8 b0 83 34 a1 5c e0 42 07
80 cc d5 cb fa 35 a3 ed ae 50 11 53 4b 71 d3 3e c9
90 1b 37 02 9d 6d d0 21 65 38 70 4a ff 68 45 00 79
a0 51 e2 73 b7 d6 8c 7a a5 43 de b2 d4 20 15 33 d8
b0 5e 10 69 84 09 05 1f ce 0c f9 40 19 62 d2 55 26
c0 b 1 99 81 13 52 e4 24 9b 18 0d 66 b9 57 e6 47 94
d0 b5 d1 0f 17 88 c4 76 e5 2d 1c 58 c6 f3 bd 0b ca
e0 db 0a 12 78 bf 25 3b 8d ec 36 9a 8e 30 5b 7c 72
f0 8b ea f4 8a f0 67 3d f7 4f 7d 41 aa 92 63 03 c7 ix. Initial internal working key 134 is generated by the DSG component 106 using the DSG vectors 126 in combination with the user key 116:
41 42 09 0e 75 4a 52 05 97 62 x. What follows is the step by step encryption process performed by the encryption/decryption component 108 of the first byte of the plaintext "Xotic Process" using an Addition/XOR/Substitution processing order.

1) Original value (byte) at the plaintext data position 0='X' or 58 (hexadecimal)
2) To that value add value e0 from position 00 of the additive table 130 to get new value 38
3) To that value XOR the initial working key 134 to provide the value 41 at position 00 to get new value 79
4) Substitute value from position 79 of the substitution table 132 to get the final value 83.
5) Repeat the above steps until the initial working key 134 is exhausted and then generate a new working key when the current working key is exhausted.
6) The above 5 steps are repeated for each byte of the plaintext data 114 data until the data is exhausted.

Stated differently, at step 1 of the encryption process described above, the byte to be processed is the data byte, which is an 'X' or hexadecimal value 58. Next, at step 2, the hexadecimal value 58 is added to e0 from position 00 of the additive table 130, which results in 38. The actual numeric value from the addition is hexadecimal 138 which is too large to fit in the 8 bits of a byte and, therefore, such value is wrapped to 38. At step 3, the value 38 from step 2 is XOR'd with the initial working key 134 value 41 from position 00, which results in a value of 79. A person skilled in the art will appreciate that the order of the addition, XOR and substitution operations can be altered at any time during the current encryption. For example, add/XOR/substitute becoming XOR/add/substitute, or the like.

Next, at step 4, the position 79 in the substitution table 132 returns a value of 83, which is the final value of the data byte "X" after encryption. The above steps are repeated until the initial working key 134 is exhausted. Once the initial working key 134 is exhausted, at step 5, a new working key is generated. The above 5 steps are repeated for each byte of the plaintext data 114 until the plaintext data 114 is encrypted.

In another example, the cryptographic application 100 implementing the EXCITE encryption process is shown with the use of multiple iterations. While three iterations are shown in the example below, any number of iterations may be used.

EXAMPLE 2

Iteration count=3
The same initial data is used as described above but with additional encryption iterations.
Original data
Xotic Process
58 6f 74 69 63 20 50 72 6f 63 65 73 73
Original key
xotic
78 6f 74 69 63
Encryption Process
Initializing for Encryption
DSG seeds for demo are
DSG seed 1=1819145164
DSG seed 2=2133878803
DSG seed 3=578068005
DSG seed 4=1313382323
DSG seed 5=1542521175
DSG seed 6=1358903071
DSG seed 7=1373624615
DSG seed 8=634434395
Initializing DSG with a Random Value of 162875739
DSG vectors for demo are
DSG vector 1=2113407355
DSG vector 2=1737839646
DSG vector 3=1018411089
DSG vector 4=1447247159
DSG vector 5=1867667233
DSG vector 6=1973043051
DSG vector 7=1913358075
DSG vector 8=1149134690
DSG initialized and ready for use
Building Working Key from Supplied Key
key=41 42 09 0e 75 4a 52 05 97 62
Encryption Substitution Table
00 01 02 03 04 05 06 07 08 09 0a 0b 0c 0d 0e 0f
00 f6 f2 2a fc d7 9f e8 31 64 eb 1a 44 a9 1d 0f 1e
10 06 2b 7b 91 ac ab e7 dc c3 c2 82 29 f1 90 a0 56
20 16 80 af 97 ad ee 23 a6 6b 9c 01 b8 89 bb a2 5d
30 dd 87 46 4d 08 95 b3 22 85 4c 39 6f 8f 60 32 5f
40 54 48 0e e1 61 f8 6e 28 e9 b4 2f c8 ba a4 2c 75
50 04 6c 2e 7f 86 14 fd 4e f5 fe 3a 74 a7 3f bc 98
60 c1 be 6a e3 b6 d9 da 5a c0 df 96 cd 9e 93 49 27
70 cf fb c5 77 7e 3c 59 a8 b0 83 34 a1 5c e0 42 07
80 cc d5 cb fa 35 a3 ed ae 50 11 53 4b 71 d3 3e c9
90 1b 37 02 9d 6d d0 21 65 38 70 4a ff 68 45 00 79
a0 51 e2 73 b7 d6 8c 7a a5 43 de b2 d4 20 15 33 d8
b0 5e 10 69 84 09 05 1f ce 0c f9 40 19 62 d2 55 26
c0 b1 99 81 13 52 e4 24 9b 18 0d 66 b9 57 e6 47 94
d0 b5 d1 0f 17 88 c4 76 e5 2d 1c 58 c6 f3 bd 0b ca
e0 db 0a 12 78 bf 25 3b 8d ec 36 9a 8e 30 5b 7c 72
f0 8b ea f4 8a f0 67 3d f7 4f 7d 41 aa 92 63 03 c7
Encryption Additive Table
00 01 02 03 04 05 06 07 08 09 0a 0b 0c 0d 0e 0f
00 e0 74 6f 9a 0e 47 c9 bd 11 d5 ca 11 f3 d1 07 6f
10 40 3c 04 88 3b 4c 97 03 1a 12 0 f dd 8c c7 a6 2e
20 a8 67 55 e6 14 5d a0 18 43 cc 5f 13 dc 61 fa 05
30 61 94 be 7f 91 1e b1 93 db 6c 80 fa 37 eb 31 49
40 2f 9c 68 8c 7c 20 5b e1 9b eb 45 6e ec 84 26 b8
50 17 09 7b f6 08 27 9b 89 b4 c0 0a a7 db a5 df 57
60 9b 15 e3 3f f8 6e 88 41 39 db e3 a5 d7 43 a6 57
70 46 c6 e3 2e 6f 39 41 08 01 dd d7 ba 15 b2 06 f5
80 0b ed d2 d7 9f e5 bf a7 80 3a bc 2b 42 f4 b0 70
90 19 b2 61 15 c0 b0 e6 61 d2 db 3d 1a 96 cc 2b 86
a0 d5 ed 99 e9 70 ce b6 5f 06 3b ad 34 7c 16 c4 0b
b0 2c 66 a0 62 50 ef 34 5a 06 70 04 c2 a8 a4 10 b2
c0 0f 36 54 53 5a c6 00 4a fb 02 0e 85 03 b2 e3 bc
d0 16 31 ed 30 2b c8 35 e5 b9 3f e3 fe ca f2 b5 60
c0 2a fa 25 46 c0 71 b0 64 65 56 65 4c c1 ad 56 52
f0 8b 46 ac 76 b5 df 86 45 00 6e 99 1b e1 00 7e 08
Original Data
58 6f 74 69 63 20 50 72 6f 63 65 73 73
Encrypting
Original byte->add from table->xor with key->swap with subst=encrypted byte
Pass: 01 Original value (byte) at data position 0='X' or 58->Add value e0 from additive position 00 to get new value 38->Xor key value 41 from position 00 to get new value 79->Substitute value from position 79 to get final value 83
Pass: 02 Modified from previous pass 83->Add value e0 from additive position 00 to get new value 63->Xor key value 41 from position 00 to get new value 22->Substitute value from position 22 to get final value af
Pass: 03 Modified from previous pass af->Add value e0 from additive position 00 to get new value 8f->Xor key value 41 from position 00 to get new value ce->Substitute value from position ce to get final value 47
Pass: 01 Original value (byte) at data position 1='o' or 6f->Add value 74 from additive position 01 to get new value e3->Xor key value 42 from position 01 to get new value a1->Substitute value from position a1 to get final value e2
Pass: 02 Modified from previous pass e2->Add value 74 from additive position 01 to get new value 56->Xor key value 42 from position 01 to get new value 14->Substitute value from position 14 to get final value ac
Pass: 03 Modified from previous pass ac->Add value 74 from additive position 01 to get new value 20->Xor key value 42 from position 01 to get new value 62->Substitute value from position 62 to get final value 6a
Pass: 01 Original value (byte) at data position 2='t' or 74->Add value 6f from additive position 02 to get new value e3->Xor key value 09 from position 02 to get new value ea->Substitute value from position ea to get final value 9a
Pass: 02 Modified from previous pass 9a->Add value 6f from additive position 02 to get new value 09->Xor key value 09 from position 02 to get new value 00->Substitute value from position 00 to get final value f6
Pass: 03 Modified from previous pass f6->Add value 6f from additive position 02 to get new value 65->Xor key value 09 from position 02 to get new value 6c->Substitute value from position 6c to get final value 9e
Pass: 01 Original value (byte) at data position 3='i' or 69->Add value 9a from additive position 03 to get new value 03->Xor key value 0e from position 03 to get new value 0d->Substitute value from position 0d to get final value 1d
Pass: 02 Modified from previous pass 1d->Add value 9a from additive position 03 to get new value b7->Xor key value 0e from position 03 to get new value b9->Substitute value from position b9 to get final value f9
Pass: 03 Modified from previous pass f9->Add value 9a from additive position 03 to get new value 93->Xor key value 0e from position 03 to get new value 9d->Substitute value from position 9d to get final value 45
Pass: 01 Original value (byte) at data position 4='c' or 63->Add value 0e from additive position 04 to get new value 71->Xor key value 75 from position 04 to get new value 04->Substitute value from position 04 to get final value d7

Pass: 02 Modified from previous pass d7->Add value 0e from additive position 04 to get new value e5->Xor key value 75 from position 04 to get new value 90->Substitute value from position 90 to get final value 1b
Pass: 03 Modified from previous pass 1b->Add value 0c from additive position 04 to get new value 29->Xor key value 75 from position 04 to get new value 5c->Substitute value from position 5c to get final value a7
Pass: 01 Original value (byte) at data position 5=' ' or 20->Add value 47 from additive position 05 to get new value 67->Xor key value 4a from position 05 to get new value 2d->Substitute value from position 2d to get final value bb
Pass: 02 Modified from previous pass bb->Add value 47 from additive position 05 to get new value 02->Xor key value 4a from position 05 to get new value 48->Substitute value from position 48 to get final value e9
Pass: 03 Modified from previous pass e9->Add value 47 from additive position 05 to get new value 30->Xor key value 4a from position 05 to get new value 7a->Substitute value from position 7a to get final value 34
Pass: 01 Original value (byte) at data position 6='P' or 50->Add value c9 from additive position 06 to get new value 19->Xor key value 52 from position 06 to get new value 4b->Substitute value from position 4b to get final value c8
Pass: 02 Modified from previous pass c8->Add value c9 from additive position 06 to get new value 91->Xor key value 52 from position 06 to get new value c3->Substitute value from position c3 to get final value 13
Pass: 03 Modified from previous pass 13->Add value c9 from additive position 06 to get new value dc->Xor key value 52 from position 06 to get new value 8e->Substitute value from position 8e to get final value 3e
Pass: 01 Original value (byte) at data position 7='r' or 72->Add value bd from additive position 07 to get new value 2f->Xor key value 05 from position 07 to get new value 2a->Substitute value from position 2a to get final value 01
Pass: 02 Modified from previous pass 01->Add value bd from additive position 07 to get new value be->Xor key value 05 from position 07 to get new value bb->Substitute value from position bb to get final value 19
Pass: 03 Modified from previous pass 19->Add value bd from additive position 07 to get new value d6->Xor key value 05 from position 07 to get new value d3->Substitute value from position d3 to get final value 17
Pass: 01 Original value (byte) at data position 8='o' or 6f->Add value 11 from additive position 08 to get new value 80->Xor key value 97 from position 08 to get new value 17->Substitute value from position 17 to get final value dc
Pass: 02 Modified from previous pass dc->Add value 11 from additive position 08 to get new value ed->Xor key value 97 from position 08 to get new value 7a->Substitute value from position 7a to get final value 34
Pass: 03 Modified from previous pass 34->Add value 11 from additive position 08 to get new value 45->Xor key value 97 from position 08 to get new value d2->Substitute value from position d2 to get final value 0f
Pass: 01 Original value (byte) at data position 9='c' or 63->Add value d5 from additive position 09 to get new value 38->Xor key value 62 from position 09 to get new value 5a->Substitute value from position 5a to get final value 3a
Pass: 02 Modified from previous pass 3a->Add value d5 from additive position 09 to get new value 0f->Xor key value 62 from position 09 to get new value 6d->Substitute value from position 6d to get final value 93
Pass: 03 Modified from previous pass 93->Add value d5 from additive position 09 to get new value 68->Xor key value 62 from position 09 to get new value 0a->Substitute value from position 0a to get final value 1a
Key Exhausted.
Generating new key
New key generated
key=62 3b 25 f0 a8 ac 4b 43 97 be
Pass: 01 Original value (byte) at data position 10='e' or 65->Add value ca from additive position 0a to get new value 2f->Xor key value 62 from position 00 to get new value 4d->Substitute value from position 4d to get final value a4
Pass: 02 Modified from previous pass a4->Add value ca from additive position 0a to get new value 6e->Xor key value 62 from position 00 to get new value 0c->Substitute value from position 0c to get final value a9
Pass: 03 Modified from previous pass a9->Add value ca from additive position 0a to get new value 73->Xor key value 62 from position 00 to get new value 11->Substitute value from position 11 to get final value 2b
Pass: 01 Original value (byte) at data position 11='s' or 73->Add value 11 from additive position 0b to get new value 84->Xor key value 3b from position 01 to get new value bf->Substitute value from position bf to get final value 26
Pass: 02 Modified from previous pass 26->Add value 11 from additive position 0b to get new value 37->Xor key value 3b from position 01 to get new value 0c->Substitute value from position 0c to get final value a9
Pass: 03 Modified from previous pass a9->Add value 11 from additive position 0b to get new value ba->Xor key value 3b from position 01 to get new value 81->Substitute value from position 81 to get final value d5
Pass: 01 Original value (byte) at data position 12='s' or 73->Add value f3 from additive position 0c to get new value 66->Xor key value 25 from position 02 to get new value 43->Substitute value from position 43 to get final value e1
Pass: 02 Modified from previous pass e1->Add value f3 from additive position 0c to get new value d4->Xor key value 25 from position 02 to get new value f1->Substitute value from position f1 to get final value ea
Pass: 03 Modified from previous pass ea->Add value f3 from additive position 0c to get new value dd->Xor key value 25 from position 02 to get new value f8->Substitute value from position f8 to get final value 4f
Encrypted Data
47 6a 9e 45 a7 34 3e 17 0f 1a 2b d5 4f Referring again to the drawings, and more particularly to FIG. 4A-B, there is shown one embodiment of the cryptographic application 100 employing a decryption process.

Beginning at step 400, the cryptographic application 100 is initialized to perform the disclosed decryption process. At step 402, the user determines to decrypt the encrypted text 136. Next, at step 404 the user supplies the encrypted text 136 to be decrypted via the data interface component 102, such as via user interface 112.

At step 406, the initialization component 104 determines if there is a need to generate an initialization value (IV) 124 (e.g. the initialization value (IV) 124 is not embedded in the encryption stream). If so, at step 408, the initialization component 104 accesses the random values (RV) 120 and the DSG seeds 122 that were stored in database 110 or any other appropriate device or location, during the encryption process. In short, these variables may be provided to the recipient via any other appropriate mechanism or method. At step 410, the initialization component 104 creates the initialization value (IV) 124 by mathematically processing the acquired DSG seeds 122 and the random values 120. The process then continues to step 414.

On the other hand, if at step 406 the initialization component 104 determines that the initialization value (IV) 124 is embedded in the encryption stream 136, the process proceeds to step 412. At step 412, the initialization component 104 accesses the initialization value (IV) 124 from the encryption stream 136 and the process continues to step 414.

At step 414, the initialization component 104 accesses the user key 116 stored in database 110 or other appropriate device or location, during the encryption process. At the next step 416, the initialization component 104 generates the initial DSG vectors 126 by mathematically processing the initialization value (IV) 124 and the user key 116.

At step 418, the DSG component 108 generates a subtractive table 138 using the DSG vectors 126. The DSG component 108 subsequently generates an inverted substitution table 140 at step 420, using the DSG vectors 126. The order of the creation of the subtractive table 138 and the inverted substitution table 140 must be consistent with the order used during encryption. Next, at step 422, the DSG component 108 creates the same initial internal working key 134 that was created during the encryption process, using the DSG vectors 126 in combination with the user key 116.

At step 424, the encryption/decryption component 108 determines if there is any noise inserted into the encrypted data stream 136. If at step 424 the encryption/decryption component 108 determines that no noise is inserted into the encrypted data stream 136, the process continues to step 428. On the other hand, if at step 424 the encryption/decryption component 108 determines that noise is inserted into the encrypted data stream 136, at step 426, the encryption/decryption component 108 extracts such noise (i.e., the encryption/decryption component 108 simply ignores the noise byte(s) and continues to the next piece of real data), and the process continues to step 428.

Next, the decryption process continues at step 428 where, the encryption/decryption component 108 determines if the current working key 134 has been exhausted, i.e., it has run its length of n bytes. If the working key 134 is not yet exhausted, the process continues to step 432 to determine if there is additional encrypted data 136 that still needs to be decrypted. However, if at step 428, the encryption/decryption component 108 determines that the working key 134 is exhausted, the process will continue to step 430. At step 430, the DSG component 106 will use the current DSG vectors 126 to create a new working key 134 of n bytes and then the process will continue to step 432.

At step 432, the encryption/decryption component 108 determines whether there is still encrypted data 136 remaining to be decrypted. If step 432 determines that all the encrypted data 136 has been decrypted, the process continues to 442, wherein the encryption/decryption component 108 determines whether multiple passes are required. If multiple passes are required, then the process continues to step 424, wherein the output data is the input data for the decryption process.

If multiple passes are not required, the process continues to step 444 for clean-up operations and then to step 446 where the decrypted text 142 is output for storage and/or other use. On the other hand, if additional encrypted data 136 remains to be decrypted, the process continues to step 434.

At step 434, the next byte of encrypted data 136 is transformed. The encryption/decryption component 108 decrypts the encrypted data 136 using the subtractive table 138, inverted substitution table 140, and the internal working key 134 to perform the appropriate subtraction, XOR and substitution operations on the current byte of encrypted data 136. Once step 434 is completed, the process continues to step 436 to verify that the current iteration has been completed. If not, the process returns to step 434 to complete the decryption process. However, if the iteration is complete, the process continues to step 438, wherein the input byte is stored in an output buffer as required. The process then continues to step 440 to access the next byte of encrypted data 136 and the next byte of the working key 134 used in the decryption process. Step 440 will return to step 424 in the decryption process to process the next byte of encrypted data 136.

In summary, therefore, to perform decryption via the cryptographic application 100 using the EXCITE process, the following steps are taken:

To prepare for the decryption process:
1. The initial DSG values must be either recreated or obtained. If the user supplies the random value generated during the encryption process, then the process can recreate the DSG values as per the encryption pattern. If the user did not supply such random values then the decryption process must obtain the DSG values from an external source or extract them from the data stream. These values are used to initialize the DSG.
2. Next the DSG component 106 generates the same working key that was used for encryption from the user's supplied key based on the DSG values applied to the user's key.
3. Then create a substitution table of 256 bytes with the values 0-255 randomly spread around the table. Since this is for decryption, the substitution table is inverted from that used during encryption.
4. Then, create an additive table of 256 bytes containing random values from 0-255.

The above steps initialize the DSG component 106 for performing an appropriate decryption process.

Thereafter, the following steps are performed to actually decrypt the data (using a substitution/XOR/subtraction processing order):
1. Get a byte of encrypted data and determine if this is noise data. If so, simply ignore and move to the next piece of real data.
2. Find the correct substitution byte for this byte of encrypted data.
3. Extract the correct substitution byte to unblind the data.
4. Optionally, steps 1-3 can be repeated an optional number of times so that the modified byte is used as the input byte for these steps. By doing this repeatedly, the original data is unblinded 'n' times.
5. XOR this byte with the next byte of the current working key thus unblinding the above byte (from step 3)
6. Subtract the value from the subtractive table modulus the input position, thus unblinding the data byte (from step 5) into the original data byte.
7. Store this final value in the output stream.
8. Repeat the above steps until the entire length of the working key has been used.
9. Generate a new random key, if necessary.

10. Repeat the above steps until the entire input stream has been decrypted.

By way of example only, and not by way of limitation, the following is an implementation of the cryptographic application 100 decrypting selected encrypted text using the EXCITE process.

EXAMPLE 3

Figure 4A:
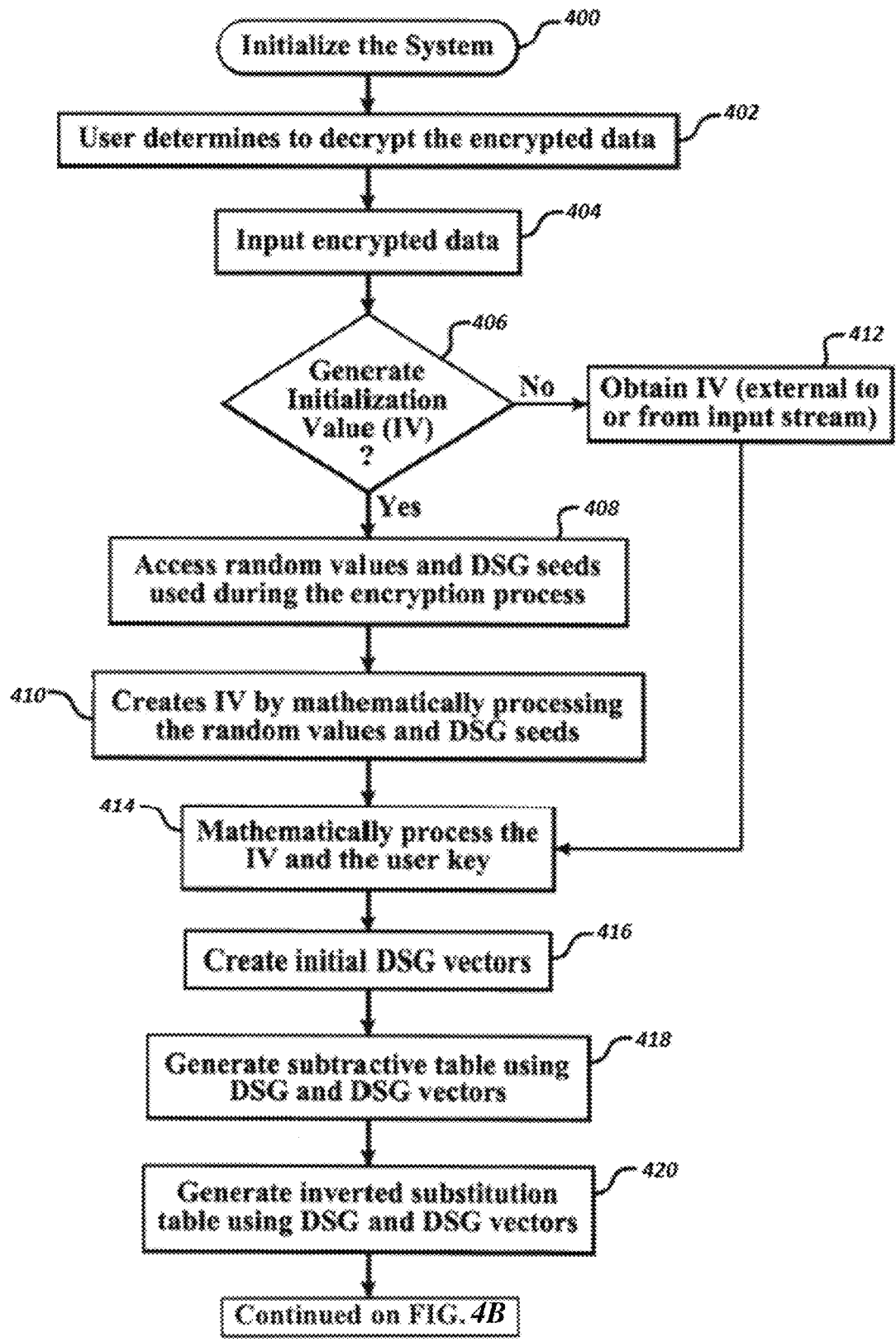
FIG. 4A-B are logic flow diagram of an exemplary method of decrypting encrypted plaintext data using the cryptographic application according to the present disclosure.
Figure 4B:
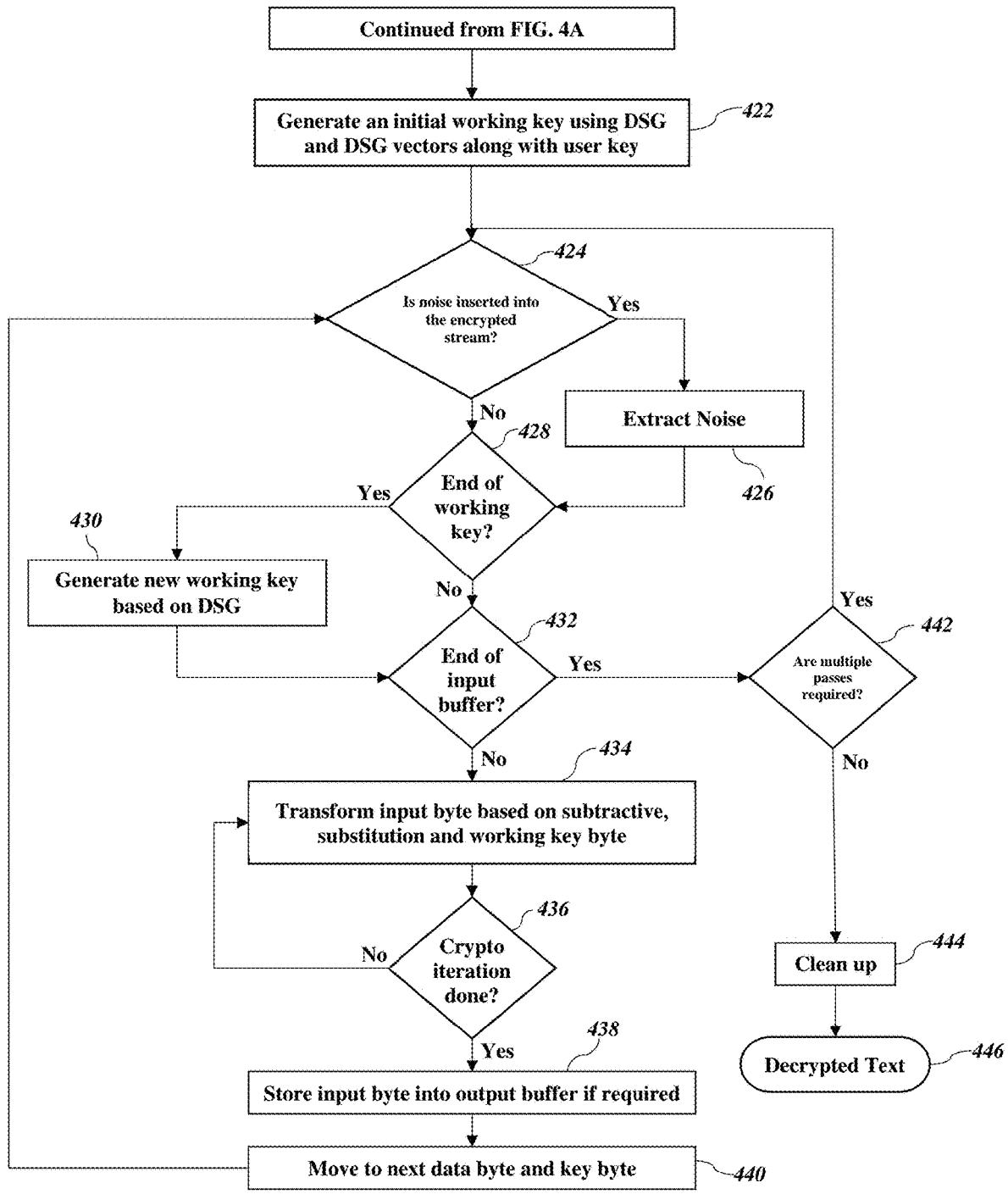

In one embodiment, encrypted text 136 is decrypted using the decryption process as disclosed in FIG. 4A-B. In this case, only one subtractive/XOR/substitution iteration pass is made per byte of encrypted text data 136. The hexadecimal format is used for display purposes only. Any number format (e.g., binary and the like) can be used to implement the disclosed encryption process.

i. Inputted encrypted text 136 as shown in hexadecimal format: 83 e2 9a 1d d7 bb c8 01 dc 3a a4 26 e1.
     The encrypted text 136 is stored in memory.
  ii. User key 116 used during the encryption process is accessed by the processor 1001: "xotic"
     "xotic" in hexadecimal format: 78 6f 74 69 63
  iii. The DSG seeds 122 used during the encryption process are accessed by the processor 1001 from memory:
     DSG seed 1=1819145164
     DSG seed 2=2133878803
     DSG seed 3=578068005
     DSG seed 4=1313382323
     DSG seed 5=1542521175
     DSG seed 6=1358903071
     DSG seed 7=1373624615
     DSG seed 8=634434395
  iv. A random value 120 used during the encryption process accessed by the data interface component 102 from database 110: 162875739. Again, no user selected random value 118 is used in this example.
  v. An initialization value (IV) 124 is generated by mathematically processing the DSG seeds 122 and the random value 120
  vi. The initial DSG vectors 126 are then generated from mathematically processing the initialization value (IV) 124 and the user key 116. The initial DSG vectors 126 are, therefore:
     DSG vector 1=2113407355
     DSG vector 2=1737839646
     DSG vector 3=1018411089
     DSG vector 4=1447247159
     DSG vector 5=1867667233
     DSG vector 6=1973043051
     DSG vector 7=1913358075
     DSG vector 8=1149134690
  vii. Subtractive table 138 is generated by the DSG component 106 using the DSG vectors 126:
00 01 02 03 04 05 06 07 08 09 0a 0b 0c 0d 0e 0f
00 e0 74 6f 9a 0e 47 c9 bd 11 d5 ca 11 f3 d1 07 6f
10 40 3c 04 88 3b 4c 97 03 1a 12 0f dd 8c c7 a6 2e
20 a8 67 55 e6 14 5d a0 18 43 cc 5f 13 dc 61 fa 05
30 61 94 be 7f 91 1e b1 93 db 6c 80 fa 37 eb 31 49
40 2f 9c 68 8c 7c 20 5b e1 9b eb 45 6e ec 84 26 b8
50 17 09 7b f6 08 27 9b 89 b4 c0 0a a7 db a5 df 57
60 9b 15 e3 3f f8 6e 88 41 39 db e3 a5 d7 43 a6 57
70 46 c6 e3 2e 6f 39 41 08 01 dd d7 ba 15 b2 06 f5
80 0b ed d2 d7 9f e5 bf a7 80 3a bc 2b 42 f4 b0 70
90 19 b2 61 15 c0 b0 e6 61 d2 db 3d 1a 96 cc 2b 86
a0 d5 ed 99 e9 70 ce b6 5f 06 3b ad 34 7c 16 c4 0b
b0 2c 66 a0 62 50 ef 34 5a 06 70 04 c2 a8 a4 10 b2
c0 0f 36 54 53 5a c6 00 4a fb 02 0e 85 03 b2 e3 bc
d0 16 31 ed 30 2b c8 35 e5 b9 3f e3 fe ca f2 b5 60
e0 2a fa 25 46 c0 71 b0 64 65 56 65 4e e1 ad 56 52
f0 8b 46 ac 76 b5 df 86 45 00 6e 99 1b e1 00 7e 08
e0 2a fa 25 46 c0 71 b0 64 65 56 65 4e e1 ad 56 52
f0 8b 46 ac 76 b5 df 86 45 00 6e 99 1b e1 00 7e 08
  viii. Inverted Substitution table 140 is generated by the DSG component 106 using the DSG vectors 126:
00 01 02 03 04 05 06 07 08 09 0a 0b 0c 0d 0e 0f
00 9e 2a 92 fe 50 b5 10 7f 34 b4 e1 de b8 c9 42 d2
10 b1 89 e2 c3 55 ad 20 d3 c8 bb 0a 90 d9 0d 0f b6
20 ac 96 37 26 c6 e5 bf 6f 47 1b 02 11 4e d8 52 4a
30 ec 07 3e ae 7a 84 e9 91 98 3a 5a e6 75 f6 8e 5d
40 ba fa 7e a8 0b 9d 32 ce 41 6e 9a 8b 39 33 57 f8
50 88 a0 c4 8a 40 be 1f cc da 76 67 ed 7c 2f b0 3f
60 3d 44 be fd 08 97 ca f5 9c b2 62 28 51 94 46 3b
70 99 8c ef a2 5b 4f d6 73 e3 9f a6 12 ee f9 74 53
80 21 c2 1a 79 b3 38 54 31 d4 2c f3 f0 a5 e7 eb 3c
90 1d 13 fc 6d cf 35 6a 23 5f c1 ea c7 29 93 6c 05
a0 1e 7b 2e 85 4d a7 27 5c 77 0c fb 15 14 24 87 22
b0 78 c0 aa 36 49 d0 64 a3 2b cb 4c 2d 5e dd 61 e4
c0 68 60 19 18 d5 72 db ff 4b 8f df 82 80 6b b7 70
d0 95 d1 bd 8d ab 81 a4 04 af 65 66 e0 17 30 a9 69
e0 7d 43 a1 63 c5 d7 cd 16 06 48 f1 09 e8 86 25 0e
f0 f4 1c 01 dc f2 58 00 f7 45 b9 83 71 03 56 59 9b
  ix. Internal working key 134 is generated by the DSG component 106 using the DSG vectors 126:
     41 42 09 0e 75 4a 52 05 97 62
     The same internal working key was used during the encryption process.
  x. What follows is the step by step decryption process of the first bite of the encrypted text "83 e2 9a 1d d7 bb c8 01 dc 3a a4 26 e1" (hexadecimal) using Substitution/XOR/Subtraction processing order.
     1) Encrypted value (byte) at the encrypted text data position 0=83 (hexadecimal)
     2) Substitute value from position 83 of the substitution table 132 to get value 79
     3) To that value XOR the initial working key 134 to provide the value 41 at position 00 to get value 38
     4) From that value, subtract value e0 at position 00 of the subtractive table 136 to get final value 58 or X
     5) Repeat the above steps until the initial working key 134 is exhausted and then generate a new working key when the current working key is exhausted.
     6) The above 5 steps are repeated for each byte of the encrypted text data 136 until the data is exhausted.

Stated differently, at step 1 of the decryption process as shown above, the byte to be processed is the data byte that is hexadecimal value 83. Next, at step 2, the position 83 in the substitution table 132 returns a value of 79. At step 3, the value 79 from the step 2 is XOR'd with the initial working key 134 to provide the value 41 from position 00, which results in a value of 38. Next, at step 4, the value e0 at position 00 of the subtractive table 138 is subtracted from the value 38 from the previous step to get a final value 58 or X. A person skilled in the art will appreciate that the order of the substitution, XOR and subtraction operations can be altered at any time during the current decryption so long as such processing order is consistent with the processing order used during the encryption process.

The above steps are repeated until the internal working key 134 is exhausted. Once the internal working key 134 is exhausted, at step 5, a new working key is generated. The above 5 steps are repeated for each byte of the encrypted text 136 until the encrypted text 136 is decrypted into the original plaintext data 114.

When multiple iterations of encryption are performed, the decryption process is performed as shown in the following example.

EXAMPLE 4

Decryption Process
Initializing for Decryption
Iterations: 3
DSG seeds for demo are
DSG seed 1=1819145164
DSG seed 2=2133878803
DSG seed 3=578068005
DSG seed 4=1313382323
DSG seed 5=1542521175
DSG seed 6=1358903071
DSG seed 7=1373624615
DSG seed 8=634434395
Extracting IV from Data Stream
DSG vectors for demo are
DSG vector 1=2113407355
DSG vector 2=1737839646
DSG vector 3=1018411089
DSG vector 4=1447247159
DSG vector 5=1867667233
DSG vector 6=1973043051
DSG vector 7=1913358075
DSG vector 8=1149134690
DSG initialized and ready for use
Building Working Key from Supplied Key
41 42 09 0e 75 4a 52 05 97 62
Inverted Decryption Substitution Table
00 01 02 03 04 05 06 07 08 09 0a 0b 0c 0d 0e 0f
00 9e 2a 92 fe 50 b5 10 7f 34 b4 c1 de b8 c9 42 d2
10 b1 89 e2 c3 55 ad 20 d3 c8 bb 0a 90 d9 0d 0f b6
20 ac 96 37 26 c6 e5 bf 6f 47 1b 02 11 4e d8 52 4a
30 ec 07 3e ae 7a 84 e9 91 98 3a 5a e6 75 f6 8e 5d
40 ba fa 7e a8 0b 9d 32 ce 41 6e 9a 8b 39 33 57 f8
50 88 a0 c4 8a 40 be 1f cc da 76 67 ed 7c 2f b0 3f
60 3d 44 be fd 08 97 ca f5 9c b2 62 28 51 94 46 3b
70 99 8c ef a2 5b 4f d6 73 e3 9f a6 12 ee f9 74 53
80 21 c2 1a 79 b3 38 54 31 d4 2c f3 f0 a5 e7 eb 3c
90 1d 13 fc 6d cf 35 6a 23 5f c1 ea c7 29 93 6c 05
a0 1e 7b 2e 85 4d a7 27 5c 77 0c fb 15 14 24 87 22
b0 78 c0 aa 36 49 d0 64 a3 2b cb 4c 2d 5e dd 61 e4
c0 68 60 19 18 d5 72 db ff 4b 8f df 82 80 6b b7 70
d0 95 d1 bd 8d ab 81 a4 04 af 65 66 e0 17 30 a9 69
e0 7d 43 a1 63 c5 d7 cd 16 06 48 f0 09 e8 86 25 0e
f0 f4 1c 01 dc f2 58 00 f7 45 b9 83 71 03 56 59 9b
Decryption Subtractive (Additive) Table
00 01 02 03 04 05 06 07 08 09 0a 0b 0c 0d 0e 0f
00 e0 74 6f 9a 0e 47 c9 bd 11 d5 ca 11 f3 d1 07 6f
10 40 3c 04 88 3b 4c 97 03 1a 12 0f dd 8c c7 a6 2e
20 a8 67 55 e6 14 5d a0 18 43 cc 5f 13 dc 61 fa 05
30 61 94 be 7f 91 1e b1 93 db 6c 80 fa 37 eb 31 49
40 2f 9c 68 8c 7c 20 5b e1 9b eb 45 6e ec 84 26 b8
50 17 09 7b f6 08 27 9b 89 b4 c0 0a a7 db a5 df 57
60 9b 15 e3 3f f8 6e 88 41 39 db e3 a5 d7 43 a6 57
70 46 c6 e3 2e 6f 39 41 08 01 dd d7 ba 15 b2 06 f5
80 0b ed d2 d7 9f e5 bf a7 80 3a bc 2b 42 f4 b0 70
90 19 b2 61 15 c0 b0 e6 61 d2 db 3d 1a 96 cc 2b 86
a0 d5 ed 99 e9 70 ce b6 5f 06 3b ad 34 7c 16 c4 0b
b0 2c 66 a0 62 50 ef 34 5a 06 70 04 c2 a8 a4 10 b2
c0 0f 36 54 53 5a c6 00 4a fb 02 0e 85 03 b2 e3 bc
d0 16 31 ed 30 2b c8 35 e5 b9 3f e3 fe ca f2 b5 60
e0 2a fa 25 46 c0 71 b0 64 65 56 65 4e e1 ad 56 52
f0 8b 46 ac 76 b5 df 86 45 00 6e 99 1b e1 00 7e 08

Encrypted Data
47 6a 9e 45 a7 34 3e 17 0f 1a 2b d5 4f
Decrypting
Encrypted byte->swap with subst->xor with key->subtract=original byte
Pass: 01 Encrypted value (byte) at data position 0=47->Substitute value from position 47 to get value ce->Xor key value 00 at position 41 to get value 8f->Subtract previous value e0 from subtractive position 00 to get final value af
Pass: 02 Encrypted value (byte) at data position 0=af->Substitute value from position af to get value 22->Xor key value 00 at position 41 to get value 63->Subtract previous value e0 from subtractive position 00 to get final value 83
Pass: 03 Encrypted value (byte) at data position 0=83->Substitute value from position 83 to get value 79->Xor key value 00 at position 41 to get value 38->Subtract value e0 from subtractive position 00 to get final value 58 or X
Pass: 01 Encrypted value (byte) at data position 1=6a->Substitute value from position 6a to get value 62->Xor key value 01 at position 42 to get value 20->Subtract previous value 74 from subtractive position 01 to get final value ac
Pass: 02 Encrypted value (byte) at data position 1=ac->Substitute value from position ac to get value 14->Xor key value 01 at position 42 to get value 56->Subtract previous value 74 from subtractive position 01 to get final value e2
Pass: 03 Encrypted value (byte) at data position 1=e2->Substitute value from position e2 to get value a1->Xor key value 01 at position 42 to get value e3->Subtract value 74 from subtractive position 01 to get final value 6f or o
Pass: 01 Encrypted value (byte) at data position 2=9e->Substitute value from position 9e to get value 6c->Xor key value 02 at position 09 to get value 65->Subtract previous value 6f from subtractive position 02 to get final value f6
Pass: 02 Encrypted value (byte) at data position 2=f6->Substitute value from position f6 to get value 00->Xor key value 02 at position 09 to get value 09->Subtract previous value 6f from subtractive position 02 to get final value 9a
Pass: 03 Encrypted value (byte) at data position 2=9a->Substitute value from position 9a to get value ea->Xor key value 02 at position 09 to get value e3->Subtract value 6f from subtractive position 02 to get final value 74 or t
Pass: 01 Encrypted value (byte) at data position 3=45->Substitute value from position 45 to get value 9d->Xor key value 03 at position 0e to get value 93->Subtract previous value 9a from subtractive position 03 to get final value f9
Pass: 02 Encrypted value (byte) at data position 3=f9->Substitute value from position f9 to get value b9->Xor key value 03 at position 0e to get value b7->Subtract previous value 9a from subtractive position 03 to get final value 1d
Pass: 03 Encrypted value (byte) at data position 3=1d->Substitute value from position 1d to get value 0d->Xor key value 03 at position 0e to get value 03->Subtract value 9a from subtractive position 03 to get final value 69 or i
Pass: 01 Encrypted value (byte) at data position 4=a7->Substitute value from position a7 to get value 5c->Xor key value 04 at position 75 to get value 29->Subtract previous value 0e from subtractive position 04 to get final value 1b Pass: 02 Encrypted value (byte) at data position 4=1b->Substitute value from position 1b to get value 90->Xor key value 04 at position 75 to get value e5->Subtract previous value 0e from subtractive position 04 to get final value d7

Pass: 03 Encrypted value (byte) at data position 4=d7->Substitute value from position d7 to get value 04->Xor key value 04 at position 75 to get value 71->Subtract value 0e from subtractive position 04 to get final value 63 or c Pass: 01 Encrypted value (byte) at data position 5=34->Substitute value from position 34 to get value 7a->Xor key value 05 at position 4a to get value 30->Subtract previous value 47 from subtractive position 05 to get final value e9

Pass: 02 Encrypted value (byte) at data position 5=e9->Substitute value from position e9 to get value 48->Xor key value 05 at position 4a to get value 02->Subtract previous value 47 from subtractive position 05 to get final value bb Pass: 03 Encrypted value (byte) at data position 5=bb->Substitute value from position bb to get value 2d->Xor key value 05 at position 4a to get value 67->Subtract value 47 from subtractive position 05 to get final value 20 or Pass: 01 Encrypted value (byte) at data position 6=3e->Substitute value from position 3e to get value 8e->Xor key value 06 at position 52 to get value dc->Subtract previous value c9 from subtractive position 06 to get final value 13

Pass: 02 Encrypted value (byte) at data position 6=13->Substitute value from position 13 to get value c3->Xor key value 06 at position 52 to get value 91->Subtract previous value c9 from subtractive position 06 to get final value c8

Pass: 03 Encrypted value (byte) at data position 6=c8->Substitute value from position c8 to get value 4b->Xor key value 06 at position 52 to get value 19->Subtract value c9 from subtractive position 06 to get final value 50 or P Pass: 01 Encrypted value (byte) at data position 7=17->Substitute value from position 17 to get value d3->Xor key value 07 at position 05 to get value d6->Subtract previous value bd from subtractive position 07 to get final value 19

Pass: 02 Encrypted value (byte) at data position 7=19->Substitute value from position 19 to get value bb->Xor key value 07 at position 05 to get value be->Subtract previous value bd from subtractive position 07 to get final value 01

Pass: 03 Encrypted value (byte) at data position 7=01->Substitute value from position 01 to get value 2a->Xor key value 07 at position 05 to get value 2f->Subtract value bd from subtractive position 07 to get final value 72 or r Pass: 01 Encrypted value (byte) at data position 8=0f->Substitute value from position 0f to get value d2->Xor key value 08 at position 97 to get value 45->Subtract previous value 11 from subtractive position 08 to get final value 34

Pass: 02 Encrypted value (byte) at data position 8=34->Substitute value from position 34 to get value 7a->Xor key value 08 at position 97 to get value ed->Subtract previous value 11 from subtractive position 08 to get final value dc Pass: 03 Encrypted value (byte) at data position 8=dc->Substitute value from position dc to get value 17->Xor key value 08 at position 97 to get value 80->Subtract value 11 from subtractive position 08 to get final value 6f or o Pass: 01 Encrypted value (byte) at data position 9=1a->Substitute value from position 1a to get value 0a->Xor key value 09 at position 62 to get value 68->Subtract previous value d5 from subtractive position 09 to get final value 93

Pass: 02 Encrypted value (byte) at data position 9=93->Substitute value from position 93 to get value 6d->Xor key value 09 at position 62 to get value 0f->Subtract previous value d5 from subtractive position 09 to get final value 3a Pass: 03 Encrypted value (byte) at data position 9=3a->Substitute value from position 3a to get value 5a->Xor key value 09 at position 62 to get value 38->Subtract value d5 from subtractive position 09 to get final value 63 or c Key Exhausted.
Generating new key
New key generated
key=62 3b 25 f0 a8 ac 4b 43 97 be Pass: 01 Encrypted value (byte) at data position 10=2b->Substitute value from position 2b to get value 11->Xor key value 00 at position 62 to get value 73->Subtract previous value ca from subtractive position 0a to get final value a9

Pass: 02 Encrypted value (byte) at data position 10=a9->Substitute value from position a9 to get value 0c->Xor key value 00 at position 62 to get value 6e->Subtract previous value ca from subtractive position 0a to get final value a4

Pass: 03 Encrypted value (byte) at data position 10=a4->Substitute value from position a4 to get value 4d->Xor key value 00 at position 62 to get value 2f->Subtract value ca from subtractive position 0a to get final value 65 or e Pass: 01 Encrypted value (byte) at data position 11=d5->Substitute value from position d5 to get value 81->Xor key value 01 at position 3b to get value ba->Subtract previous value 11 from subtractive position 0b to get final value a9

Pass: 02 Encrypted value (byte) at data position 11=a9->Substitute value from position a9 to get value 0c->Xor key value 01 at position 3b to get value 37->Subtract previous value 11 from subtractive position 0b to get final value 26

Pass: 03 Encrypted value (byte) at data position 11=26->Substitute value from position 26 to get value bf->Xor key value 01 at position 3b to get value 84->Subtract value 11 from subtractive position 0b to get final value 73 or s Pass: 01 Encrypted value (byte) at data position 12=4f->Substitute value from position 4f to get value f8->Xor key value 02 at position 25 to get value dd->Subtract previous value f3 from subtractive position 0c to get final value ea Pass: 02 Encrypted value (byte) at data position 12=ea->Substitute value from position ea to get value f1->Xor key value 02 at position 25 to get value d4->Subtract previous value f3 from subtractive position 0c to get final value e1

Pass: 03 Encrypted value (byte) at data position 12=e1->Substitute value from position e1 to get value 43->Xor key value 02 at position 25 to get value 66->Subtract value f3 from subtractive position 0c to get final value 73 or s Decrypted Data 58 6f 74 69 63 20 50 72 6f 63 65 73 73

Decrypting Done

Comparing

Decrypted=Original

Iteration count=3, time=3022 ticks

The cryptographic application 100 is suitably used to encrypt and/or decrypt data for any number of applications. In one embodiment, the cryptographic application 100 may be installed any suitable device including, but not limited to, a personal computing device, an electronic communication device, a networked environment, a cloud computing network, audio/video devices, and the like, and combinations thereof. In one example, a user may desire to encrypt selected plaintext data using a personal computing device. In such scenario, the user would initialize the cryptographic application 100 installed on the personal computing device by any suitable means. As set forth in detail above, the user would generate or obtain the random value 120 and the DSG seeds 122 and transmit them to the initialization component 104. The initialization component 104 would mathematically process the random value 120 and the DSG seeds 122 to generate an initialization value (IV) 124. After generation of the initialization value (IV) 124, the initialization component 104 mathematically processes the initialization value (IV) 124 along with the user key 116 to generate initial DSG vectors 126.

The DSG component 106, using the initial DSG vectors 126, generates an additive table 130, a substitution table 132, and an initial internal working key 134. After the additive table 130, the substitution table 132, and the internal working key 134 are created by the DSG component 106, the encryption/decryption component 108 starts encrypting the plaintext data 114. Once the plaintext data 114 is encrypted by the encryption/decryption component 108, the encrypted text 136 may suitably be stored in the database 110 for subsequent access or transmitted to another user for decryption.

To decrypt the encrypted text, a user would initialize the cryptographic application on the device to be used for decryption. The initialization value (IV) 124 is either generated using the random values (RV) 120 and the DSG seeds 122 or obtained from the encrypted text 136. The initialization component 104 then generates the initial DSG vectors 126 by mathematically processing the initialization value (IV) 124 and the user key 116. Using the DSG vectors 126, the DSG component 108 generates a subtractive table 138 and an inverted substitution table 140. The DSG component 108 then creates the same initial internal working key 134 that was created during the encryption process, using the DSG vectors 126 in combination with the user key 116. After the subtractive table 138, the inverted substitution table 140, and the internal working key 134 are created by the DSG component 106, the encryption/decryption component 108 starts decrypting the encrypted text 136.

The same method would be followed if the user to access the cryptographic application 100 via an electronic communication device, a networked environment, a cloud computing network, or any other suitable computing or electronic component.

The various embodiments and examples described herein are provided by way of illustration only and should not be construed to limit the claimed invention, nor the scope of the various embodiments and examples. Those skilled in the art will readily recognize various modifications and changes that may be made to the claimed invention without following the example embodiments and applications illustrated and described herein, and without departing from the true spirit and scope of the claimed invention, which is set forth in the following claims. In addition, various embodiments may be combined. Therefore, reference to an embodiment, one embodiment, in some embodiments, in other embodiments, and the like does not preclude one or more methods, functions, steps, features, results, hardware implementations, or software implementations of different embodiments from being combined. Further, reference to an embodiment, one embodiment, in some embodiments, in other embodiments, examples, and the like provides various aspects that may or may not be combined with those of one or more different embodiments and/or examples.

The invention claimed is:

1. A method for encrypting plaintext data by via a computing system, wherein the computing system comprises
   (a) a processor operable to control the computing system,
   (b) a data storage operatively coupled to the processor, wherein the data storage is configured to store a plurality of user keys, a plurality of DSG vectors, a plurality of encryption tables, a plurality of working keys, and combinations thereof;
   (c) a data interface component, operatively coupled to the processor, wherein the data interface component is configured to receive a plurality of data for transmission to the processor, wherein the data interface component is configured to transmit a plurality of data generated by the processor,
   (d) an initialization component operatively coupled to the processor and controlled in part by the processor, wherein the initialization component is configured to generate a plurality of data to be used in the encryption of the plaintext data,
   (e) a Deterministic Sequence Generator (DSG) component operatively coupled to the processor and controlled in part by the processor, wherein the DSG component is configured to generate a plurality of encryption tables to be used in the encryption of the plaintext data, and
   (f) an encryption component operatively coupled to the processor and controlled in part by the processor, wherein the encryption component is configured to encrypt plaintext data, the method comprising:
      receiving, via the data interface component, at least one request from the associated user to encrypt plaintext data, wherein the at least one user request comprises selected plaintext data to be encrypted, a user key, a first random value, and a set of DSG seeds;
      transmitting the first random value and the set of DSG seeds to the initialization component;
      generating, by the initialization component, an initialization value from the first random value and the set of DSG seeds;
      generating, by the initialization component, a set of initial DSG vectors from the initialization value and the user key and transmitting the initial DSG vectors to the DSG component;
      generating, by the DSG component, an additive table, a substitution table, and a first working key from the set of initial DSG vectors;

encrypting, by the encryption component, at least a portion of the selected plaintext data to generate encrypted plaintext data by performing:
(a) an additive operation on each byte of at least a portion of the selected plaintext data using the additive table;
(b) an XOR operation on each byte of at least a portion of the selected plaintext data; and
(c) a substitution operation on each byte of at least a portion of the selected plaintext data using the substitution table;
wherein during the encryption of the plaintext data, the encryption component determines whether the current working key is exhausted,
wherein based on a determination that the current working key is exhausted, generating, by the DSG component, a new working key from the set of initial DSG vectors for use by the encryption component; and
storing at least a portion of the encrypted plaintext data in the data storage.

2. The method of claim 1, further comprising:
determining, encryption component, whether all of the selected plaintext data included in the at least one request has been encrypted;
upon a determination that all of the selected plaintext data has not been encrypted, encrypting, encryption component, the remaining selected plaintext data by performing steps (a) through (c) until all the selected plaintext data has been encrypted.

3. The method of claim 1, further comprising transmitting, via the data interface component, at least a portion of the encrypted plaintext data to at least one remote device.

4. The method of claim 1,
wherein the at least one user request further comprises a second random value;
wherein the initialization value is generated from the first random value, the second random value, and the set of DSG seeds.

5. The method of claim 1, wherein the length of the first working key and the length of the new working keys are at least twice the length of the user key.

6. The method of claim 1, further comprising altering the order of the addition operation, the XOR operation, and the substitution operation during the encryption of at least a portion of the selected plaintext data by the encryption component.

7. The method of claim 1, further comprising performing, by the encryption component, a plurality of encryption iterations during the encryption of at least a portion of the selected plaintext data.

8. The method of claim 1, wherein each of the additive table and the substitution table comprises at least 256 random numbers.

9. The method of claim 8, wherein the additive table comprises repeated values.

10. The method of claim 1, wherein each DSG seed of the set of DSG seeds is a random number.

11. The method of claim 1, wherein each DSG seed of the set of DSG seeds is mathematically congruent to at least one formula and at least one algorithm used in generating the additive table, the XOR table, and the substitution table by the DSG.

12. The encryption device of claim 1, further comprising shuffling, by the DSG component, 256 times during the generation of each of the additive table and the substitution table.

13. A method for decrypting encrypted data via a computing system, wherein the computer system comprises
(a) a processor operable to control the computing system,
(b) a data storage operatively coupled to the processor, wherein the data storage is configured to store a plurality of user keys, a plurality of DSG vectors, a plurality of decryption tables, a plurality of working keys, and combinations thereof;
(c) a data interface component, operatively coupled to the processor, wherein the data interface component is configured to receive a plurality of data for transmission to the processor, wherein the data interface component is configured to transmit a plurality of data generated by the processor,
(d) an initialization component operatively coupled to the processor and controlled in part by the processor, wherein the initialization component is configured to generate a plurality of data to be used in the decryption of the plaintext data,
(e) a Deterministic Sequence Generator (DSG) component operatively coupled to the processor and controlled in part by the processor, wherein the DSG component is configured to generate a plurality of decryption tables to be used in the decryption encrypted data, and
(f) a decryption component operatively coupled to the processor and controlled in part by the processor, wherein the decryption component is configured to decrypt the encrypted data, the method comprising:
receiving, via the data interface component, at least one request from the associated user to decrypt encrypted data, wherein the at least one user request includes selected encrypted data to be decrypted;
extracting, by the data interface component, a user key, a first random value and a set of DSG seeds from at least one of the at least one user request, memory, and combinations thereof;
transmitting the first random value and the set of DSG seeds to the initialization component;
generating, by the initialization component, an initialization value from the first random value and the set of DSG seeds;
generating, by the initialization component, a set of initial DSG vectors from the initialization value and the user key and transmitting the DSG vectors to the DSG component;
generating, by the DSG component, a subtractive table, an inverted substitution table, and a first working key from the set of initial DSG vectors;
decrypting, by the decryption component, at least a portion of the selected encrypted data to generate decrypted plaintext data by performing:
(a) a substitution operation on each byte of at least a portion of the selected encrypted data using the inverted substitution table;
(b) an XOR operation on each byte of at least a portion of the selected encrypted data; and
(c) a subtraction operation on each byte of at least a portion of the selected encrypted data using the subtractive table;
wherein during the decryption of the plaintext data, the decryption component determines whether the current working key is exhausted,
wherein based on a determination that the current working key is exhausted, generating, by the DSG component, a new working key from the set of initial DSG vectors for use by the encryption component; and storing at least a portion of the decrypted data in the data storage.

14. The method of claim 13, further comprising:
determining, by the decryption component, whether all of the selected encrypted data included in the at least one user request has been decrypted;
upon a determination that all of the selected encrypted data has not been decrypted, decrypting, by the decryption component, the remaining selected encrypted data by performing steps (a) through (c) until all the selected encrypted data has been decrypted.

15. The method of claim 13, further comprising transmitting, via the data interface component, at least a portion of the decrypted plaintext data to at least one remote device.

16. The method of claim 13, further comprising extracting, by the data interface component, from at least one of the at least one user request and data storage a second random value, and generating, by the initialization component, the initialization value from the first random value, the second random value, and the set of DSG seeds.

17. The method of claim 13, wherein the length of the first working key and the length of the new working keys are at least twice the length of the user key.

18. The method of claim 13, further comprising altering the order of the substitution operation, the XOR operation, and the subtractive operation during the decryption of at least a portion of the selected encrypted data by the decryption component.

19. The method of claim 13, further comprising performing, by the decryption component, a plurality of decryption iterations during the decryption of at least a portion of the selected encrypted data.

20. The method of claim 13, wherein each of the subtractive table and the inverted substitution table comprises at least 256 random numbers.

* * * * *